(12) United States Patent
Bregulla et al.

(10) Patent No.: US 12,158,683 B2
(45) Date of Patent: Dec. 3, 2024

(54) OPTICAL ELEMENT WITH VARIABLE TRANSMISSION AND SCREEN COMPRISING SUCH AN OPTICAL ELEMENT

(71) Applicant: siOPTICA GmbH, Jena (DE)

(72) Inventors: Andreas Bregulla, Duderstadt (DE); André Heber, Weimar (DE); Yannick Bourgin, Ilmtal-Weinstrasse OT Ossmannstedt (DE); Ambrose Peter Nari, Jena (DE); Chin Tien Yang, Kaohsiung (TW); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 634 days.

(21) Appl. No.: 17/442,078

(22) PCT Filed: Aug. 18, 2020

(86) PCT No.: PCT/EP2020/073088
§ 371 (c)(1),
(2) Date: Sep. 22, 2021

(87) PCT Pub. No.: WO2021/032735
PCT Pub. Date: Feb. 25, 2021

(65) Prior Publication Data
US 2022/0171249 A1 Jun. 2, 2022

(30) Foreign Application Priority Data

Aug. 21, 2019 (DE) ...................... 10 2019 006 022.9
May 5, 2020 (DE) ...................... 10 2020 002 797.0
May 14, 2020 (DE) ...................... 10 2020 003 265.6

(51) Int. Cl.
*G02F 1/1673* (2019.01)
*G02F 1/167* (2019.01)
*G02F 1/1676* (2019.01)

(52) U.S. Cl.
CPC ............ *G02F 1/1673* (2019.01); *G02F 1/167* (2013.01); *G02F 1/1676* (2019.01)

(58) Field of Classification Search
CPC ...... G02F 1/167; G02F 1/0018; G02F 1/0063; G02F 1/15165; G02F 1/1533;
(Continued)

(56) References Cited

U.S. PATENT DOCUMENTS 5,993,940 A 11/1999 Ouderkirk et al.
6,323,989 B1 11/2001 Jacobson et al.
(Continued)

FOREIGN PATENT DOCUMENTS

CN 101227556 A 7/2008
CN 102159934 A 8/2011
(Continued)

*Primary Examiner* — Brandi N Thomas
(74) *Attorney, Agent, or Firm* — Christensen, Fonder, Dardi & Herbert PLLC

(57) ABSTRACT

An optical element comprising a planar substrate with a first large surface functioning as a light-entrance surface, and a second large surface functioning as a light-exit surface. The optical element further comprises a liquid or skeleton matrix arranged between the first and second large surface, and electrophoretically or magnetophoretically movable particles that interact with light of one or several wavelengths or wavelength ranges. The optical element also comprises an electromagnetic switching structure configured in a planar shape in the substrate on one or both large surfaces and/or between the large surfaces, these electromagnetic switching structures generating, in a switched-on state, an electromagnetic field, whereby the particles are moved in the liquid or the skeleton matrix, thus causing, due to the interaction with (Continued)

the particles, a change of an angle-dependent transmission, by the optical element, of light of the wavelengths or wavelength ranges that enters the substrate through the light-entrance surface.

36 Claims, 9 Drawing Sheets

(58) Field of Classification Search
CPC .... G02F 1/157; G02F 1/163; G02F 2201/086; G02F 1/1323; G02F 1/1336; G02F 1/133603; G02F 1/133626; G02F 1/1685; G02F 2001/1678; G02F 2201/44; G02F 2203/34; G02F 2203/62; G02B 5/223; G02B 5/23; G02B 30/27; G02B 30/31; G02B 6/0031; G02B 6/0041; G02B 6/0076; G09G 2310/06; G09G 3/3446; G09G 2300/023; G09G 2300/0452; G09G 2300/08; G09G 2300/0809; G09G 2310/061; G09G 2320/068; G09G 2358/00; G09G 3/003; G09G 3/3406; G09G 3/342; G09G 3/3426; G02C 7/101; G02C 7/102
See application file for complete search history.

(56) References Cited

U.S. PATENT DOCUMENTS

| | | | |
|---|---|---|---|
| 6,765,550 B2 | 7/2004 | Janick et al. | |
| 8,130,441 B2 | 3/2012 | Frazier et al. | |
| 9,229,261 B2 | 1/2016 | Schwartz et al. | |
| 9,740,075 B2 | 8/2017 | Sadlik et al. | |
| 2003/0231162 A1 | 12/2003 | Kishi | |
| 2006/0215252 A1 | 9/2006 | Moriyama et al. | |
| 2007/0084549 A1 | 4/2007 | Graham et al. | |
| 2007/0206263 A1 | 9/2007 | Neuman et al. | |
| 2008/0211734 A1 | 9/2008 | Huitema et al. | |
| 2010/0277448 A1 | 11/2010 | Okamoto et al. | |
| 2010/0315693 A1 | 12/2010 | Lam et al. | |
| 2012/0223929 A1 | 9/2012 | Sato | |
| 2012/0235891 A1 | 9/2012 | Nishitani et al. | |
| 2012/0249895 A1 | 10/2012 | Kaifu | |
| 2013/0308185 A1 | 11/2013 | Robinson et al. | |
| 2014/0354612 A1 | 12/2014 | Okamoto et al. | |
| 2015/0346578 A1 | 12/2015 | Amundson, Jr. et al. | |
| 2016/0077364 A1 | 3/2016 | Shiota | |
| 2016/0291357 A1 | 10/2016 | Min et al. | |
| 2017/0069236 A1* | 3/2017 | Klippstein | G02F 1/1336 |
| 2019/0004346 A1 | 1/2019 | Klippstein et al. | |
| 2019/0101806 A1 | 4/2019 | Takaya et al. | |
| 2019/0121172 A1 | 4/2019 | Shigemura et al. | |
| 2019/0146604 A1 | 5/2019 | Uchiyama | |
| 2020/0050010 A1 | 2/2020 | Zheng et al. | |

FOREIGN PATENT DOCUMENTS

| | | |
|---|---|---|
| CN | 102253559 A | 11/2011 |
| CN | 102654710 A | 9/2012 |
| CN | 102736279 A | 10/2012 |
| CN | 205212521 U | 5/2016 |
| CN | 106030388 A | 10/2016 |
| CN | 108369353 A | 8/2018 |
| CN | 109683421 A | 4/2019 |
| CN | 109991791 A | 7/2019 |
| DE | 10 2015 012 271 A1 | 4/2017 |
| DE | 10 2019 006 022 B3 | 7/2020 |
| EP | 3 066 514 B1 | 2/2019 |
| JP | 2007-017735 A | 1/2007 |
| JP | 2007-79532 A | 3/2007 |
| JP | 2007-155783 A | 6/2007 |
| JP | 2016-62092 A | 4/2016 |
| JP | 2017-167344 A | 9/2017 |
| JP | 2019-78882 A | 5/2019 |
| JP | 2019-90969 A | 6/2019 |
| KR | 10-2010-0102085 A | 9/2010 |
| WO | WO 90/13052 A1 | 11/1990 |
| WO | WO 2012/033583 A1 | 3/2012 |
| WO | WO 2013/169959 A1 | 11/2013 |
| WO | WO 2015/121398 A1 | 8/2015 |
| WO | WO 2017/097975 A1 | 6/2017 |
| WO | WO 2018/148153 A1 | 8/2018 |
| WO | WO 2018/232099 A1 | 12/2018 |
| WO | WO 2021/032735 A1 | 2/2021 |

* cited by examiner

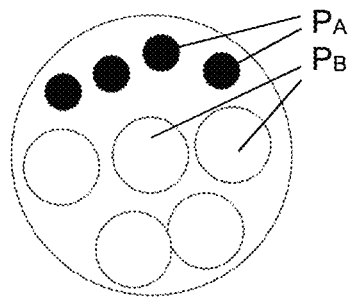
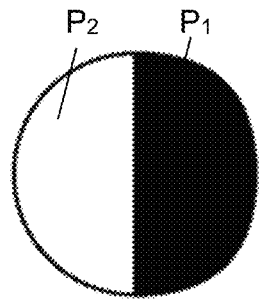
Fig.19          Fig.20
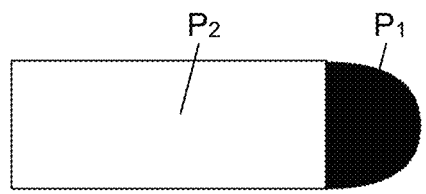
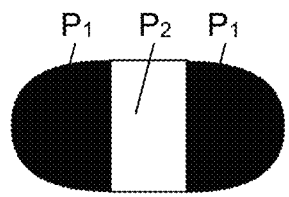
Fig.21          Fig.22
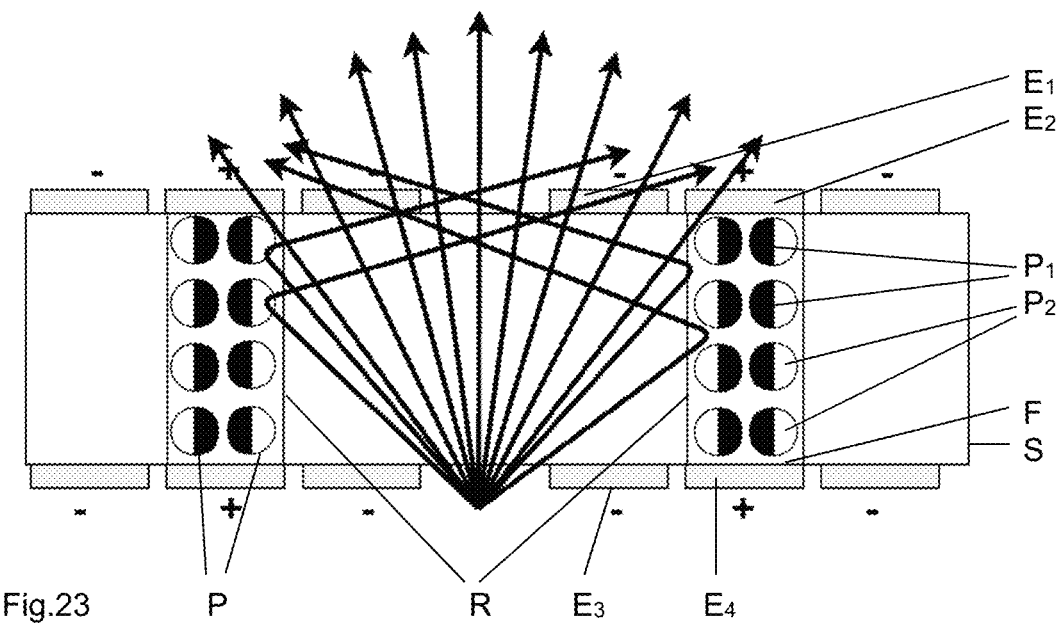
Fig.23

OPTICAL ELEMENT WITH VARIABLE TRANSMISSION AND SCREEN COMPRISING SUCH AN OPTICAL ELEMENT

PRIORITY CLAIM

The present application is a National Phase entry of PCT Application No. PCT/EP2020/073088, filed Aug. 18, 2020, which claims priority from German Patent Application No. 10 2019 006 022.9, filed Aug. 21, 2019, German Patent Application No. 10 2020 002 797.0, filed May 5, 2020, and German Patent Application No. 10 2020 003 265.6, filed May 14, 2020, the disclosures of which are hereby incorporated by reference herein in their entirety.

FIELD OF THE INVENTION

In recent years, great strides have been made in enlarging the visual angle of LCDs. Frequently, however, there are situations in which such a very large angular viewing range of a display screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share information displayed on their screen with others, e.g., when looking at vacation snaps or reading advertisements, and, on the other hand, a narrow viewing angle if they want to keep image information private.

A similar problem is encountered in vehicles: Here, when the motor is running, the driver must not be distracted by image contents such as digital entertainment shows, whereas a front-seat passenger would like to watch them during the ride. This requires a screen that can be switched between corresponding display modes.

DESCRIPTION OF PRIOR ART

Accessory foils based on micro-louvers have already been used for mobile displays to provide them with visual data protection (a privacy mode). However, such foils had no facility for (changeover) switching but had to be applied and removed manually. In addition, they have to be carried separately from the display screen when not in use. A substantial disadvantage is the light loss accompanying the use of such louver foils.

U.S. Pat. No. 6,765,550 B2 describes such visual protection provided by micro-louvers. The chief disadvantages therein are the need to attach and remove the filter mechanically, and the light loss encountered in the privacy mode.

In U.S. Pat. No. 5,993,940 A, a privacy mode is achieved by means of a foil having small prism stripes regularly arranged on its surface. Designing and fabricating such a foil are rather complex tasks.

In WO 2012/033583 A1, switching between free and restricted viewing modes is performed by triggering liquid crystals arranged between so-called "chromonic" layers. This causes a light loss and is rather complicated to produce.

US 2012/0235891 A1 describes a very complicated backlight used in a screen. According to FIGS. 1 and 15, this backlight comprises not only a number of light guides but also further complex optical elements such as, e.g., micro-lens elements 40 and prism structures 50, which transform the light on its path from the rear to the front illuminator. This is expensive and complicated to implement, and involves light loss, too. In the version according to FIG. 17 in US 2012/0235891, both light sources 4R and 18 produce light with a narrow illuminating angle, wherein the light originating from the rear light source 18 is first converted by a complex procedure into light having a wide illuminating angle. As mentioned above, this complex conversion severely reduces brightness.

According to JP 2007-155783 A, special optical surfaces 19, complicated to design and to fabricate, are used to deflect light into varied narrow or wide ranges depending on the angles of light incidence. These structures resemble Fresnel lenses and have inactive edges that deflect light into undesirable directions. It is uncertain, therefore, whether actually sensible light distributions can be achieved.

US 2013/0308185 A1 describes a special light guide configured with steps, which radiates light from a large surface into various directions, depending on the direction from which it receives light on a narrow side. By interaction with a transmissive image display device, e.g., an LC display, one can thus produce a screen that can be switched between a free and a restricted viewing mode. The disadvantage is that that the restricted viewing effect can be created either for left/right only or for top/bottom only, but not simultaneously for left/right/top/bottom, which would be necessary for certain payment procedures. In addition, even in the restricted viewing mode, some residual light is visible from blocked viewing angles.

The Applicant's WO 2015/121398 A1 described a display screen for two operating modes, switching between which is essentially effected by means of scattering particles provided in the volume of the respective light guide. As a rule, however, the scattering particles selected there, consisting of a polymerizate, have the common disadvantage that light is coupled out of both large surfaces, whereby about half of the useful light is radiated into the wrong direction, i.e. toward the background illuminator, where, due to the arrangement, it cannot be recycled to a sufficient extent. Moreover, the scattering particles of polymerizate distributed in the volume of the light guide, especially in higher concentrations, may possibly lead to scattering effects that may lessen the privacy effect in the protected mode.

As a rule, the methods and arrangements mentioned above have the common disadvantage that they markedly reduce the brightness of the basic screen, and/or need a complex and expensive optical element for switching between modes, and/or reduce the resolution in the free viewing mode.

SUMMARY OF THE INVENTION

Departing from this, the problem of the invention is to describe an optical element that can influence the transmission depending on the (optionally vertical) angle and that can be switched between at least two operating states. The operating element is intended to be implementable at reasonable cost and be universally applicable especially with varied types of display screens to enable switching between a privacy mode and a free viewing mode, without substantially reducing the resolution of such a screen. Optionally, the optical element may do without louver-type chambers.

According to the invention, this problem is solved by means of an optical element, which can have a variety of configurations. In any case, the optical element comprises an essentially planar substrate with a first large surface adapted to function as a light entrance surface, a second large surface adapted to function as a light exit surface, and a liquid or a skeleton matrix that is arranged between the first and the second large surface and contains electrophoretically or magnetophoretically movable particles interacting with light of one or several wavelengths or wavelength ranges preferably visible by a human eye. The interaction with light takes place by absorption, reflection and/or scattering, or, where required, by transmission. Herein, particles that absorb light are also called absorption particles; particles that reflect, scatter or—in interaction—transmit light, are also called deflection particles.

The optical element further comprises electromagnetic switching means which are configured in planar fashion on one or both large surfaces and/or in the substrate between the large surfaces, and which, in a switched-on state, generate an electromagnetic field, whereby the particles are moved in the liquid or in the skeleton matrix so that an angle-dependent transmission by the optical element of light of the wavelengths or wavelength ranges entering the substrate via the light entrance surface will change due to the interaction with the particles. Here, "electromagnetic switching means" is understood as a generic term including purely electrical switching means for the generation of an electric field, electromagnetic switching means for the generation of a magnetic field, and a combination of both.

In a first alternative, the particles absorb or scatter light of the said wavelengths or wavelength ranges, and the liquid or skeleton matrix contains up to 60 volume percent of the particles, the electromagnetic field being effective between the large surfaces. In a second, third and fourth alternative, the optical element comprises a multiplicity of chambers embedded in the substrate, which, depending on their size, either form a separate louver each, or are gathered in groups with each group forming a louver, wherein the louvers extend between the first large surface and the second large surface, with each louver having longitudinal and narrow sides, with the narrow sides of each louver being arranged within the region of the large surfaces and the longitudinal sides connecting the large surfaces.

In the second alternative, the particles absorb or scatter light of the said wavelengths or wavelength ranges that, via the light entrance surface, enters the substrate at angles that cause it to hit the chambers. Here, each of the chambers forms a separate louver and is filled with the liquid, wherein the liquid contains up to 50 or preferably, for greater freedom of motion, up to 20 volume percent of the particles, and the electromagnetic switching means, in their switched-on state, generates an electromagnetic field effective in the chambers.

In a third alternative, the liquid or skeleton matrix with which the chambers are filled contains up to 95 volume percent of the particles. The particles may comprise at least first particles of a first kind $P_A$, which absorb light of the said wavelengths or wavelength ranges, and/or second particles of a second kind $P_B$, which reflect and/or scatter light of the said wavelengths or wavelength ranges. In the case that only one kind of particles exists—first particles of the first kind $P_A$ or second particles of the second kind $P_B$—, the liquid or the skeleton matrix plays the part of the other kind of particles. Altogether, due to the electric field, there occurs a change of the angle-dependent transmission by the optical element of light of the said wavelengths that, via the light entrance surface, enters the substrate at angles that cause it to hit the louvers.

In the fourth alternative, in which the liquid or the skeleton matrix with which the chambers are filled also contains up to 95 volume percent of the particles, the particles are configured as so-called Janus particles. The term "Janus particles" is understood to designate microparticles or nanoparticles the surfaces of which have, in separate regions, at least two different physical properties. For example, a spherical particle can be divided into two hemispheres, with either hemisphere having different properties, which can be achieved, e.g., by appropriate coatings/functionalizations, or by means of an intrinsic structural difference. Janus particles, then, have at least a region with a first structure $P_1$ and, differing therefrom, a second region with a second structure $P_2$, with the first structures $P_1$ absorbing light of the said wavelengths or wavelength ranges, and the second structures $P_2$ reflecting and/or scattering light of the said wavelengths or wavelength ranges. This way, too, will change the angle-dependent transmission by the optical element of light of the said wavelengths that enters the substrate via the light entrance surface, at angles causing that light to hit the louvers.

The skeleton matrix, with which the chambers are filled advantageously, is, for example, a polymer matrix or preferably a gel matrix. The liquid may have or not have a polarity. Further, it may consist, e.g., of water, oil, toluene or formaldehyde, or mixed with a ferrofluid of 10 volume percent and/or electrolytes.

The one or several wavelengths or wavelength ranges in which the electrophoretically or magnetophoretically movable particles $P_A$ absorb light preferably lie in the visible spectrum and preferably cover this completely. For special purposes, however, they may lie outside the visible spectrum, e.g., if UV or IR light is intended to be influenced, such as in measurements.

The first and the second large surface of the planar substrate are preferably arranged in parallel to each other. However, in special configurations, if it is intended to achieve particular angle-dependent transmissions of the optical element, the large surfaces may be arranged otherwise, e.g. in a wedge-shaped manner at a defined angle between them of up to 20 degrees. The first large surface of the planar substrate, adapted to function as a light entrance surface, is as a rule situated on the rear side of the substrate as seen from a viewer, and, depending on the particular application of the optical element, borders on, e.g., an image display device, a light source, or a volume of air. From the last-named objects, light will then enter the substrate through the said light entrance surface.

The particles according to the first or second alternative, and the first particles of the first kind $P_A$ according to the third alternative may be nanoparticles, quantum dots and/or dyes, which have a spatial extension of maximally 200 nm, preferably of maximally 100 nm or maximally 50 nm or, with particular preference of maximally 20 nm. Other configurations are explicitly possible. "Spatial extension" means the maximum extension in the three-dimensional space, or the hydrodynamic radius, depending on which one is greater. In spherical particles, then, this extension is the diameter. In chain-like particles it is the greatest possible spacing between two points on the surface of the particle.

These particles according to the first or second alternative and the first particles of the first kind $P_A$ according to the third alternative can be fashioned as BPQDs (black phosphorus quantum dots), lead sulfide (PbS), CdTeSeS quantum dots, azo-dyes and/or as metal oxide particles, preferably of chromium (IV) oxide or $Fe_2O_3$, and have a size between 2 nm and 50 nm, inclusive of these limits.

Alternatively, it is possible for the said particles according to the first or second alternative and the first particles of the first kind $P_A$ according to the third alternative to be fashioned as paramagnetic bodies, preferably as spheres with a diameter of at least 100 nm, of a paramagnetic or diamagnetic carrier material having a relative magnetic permeability between 0.5—or , better, between 0.75 and 2 or with particular preference, with a relative magnetic permeability of 1, preferably of melamine resin or polystyrene, wherein the bodies are coated either with paramagnetic or superparamagnetic nanoparticles having a relative magnetic permeability greater than 10, preferably with $Fe_2O_3$ nanoparticles, or wherein the carrier material is interspersed with these nanoparticles. Other implementing versions are possible as well.

In case of the third alternative, the first particles $P_A$ and/or second particles $P_B$ are, advantageously embedded in stationary capsules that re located on marginal surfaces of the chambers or form the chambers. As already described above, the first particles $P_A$ are advantageously fashioned as nanoparticles. The second particles $P_B$ are advantageously fashioned as transparent or reflecting spheres with diameters between 5 nm and 5000 nm.

In case of the fourth alternative, the particles P, which are fashioned as Janus particles occupying stationary locations on marginal surfaces of the chambers R, are freely rotatable.

In this fourth alternative, the particles P are fashioned as Janus particles with a spherical surface, in which both the first and the second region are constituted by hemispheres of the spherical surface. The particles P are preferably fashioned as microparticles and have a spatial extension of maximally 200 μm, preferably of maximally 50 μm or, with particular preference, of maximally 20 μm. In particular, it is conceivable that the Janus particles are fashioned of a transparent material, preferably polystyrene, melamine resin or silica, and that one of the hemispheres, to implement electrophoretic properties, is coated with a metal layer or a metallic nanoparticle layer.

Furthermore it is possible that the Janus particles consist of a transparent material, preferably latex, PMMA, polystyrene, melamine resin or silica, with one of the hemispheres, to implement magnetophoretic properties, being coated with a ferromagnetic and absorbing metal or metal oxide layer or a ferromagnetic nanoparticle layer, preferably with $Fe_2O_3$, $Fe_3O_4$ or FeO nanoparticles, and the other hemisphere being coated with a reflecting layer, preferably a silver or aluminum layer or a white layer.

As already explained above, the essential characteristic of a spherical Janus particle is that it has two hemispheres implementing physical properties differing from one another. The first hemisphere is intended to absorb light incident on it, whereas the other hemisphere is intended to scatter or reflect light incident on it. Thus, the light-absorbing first hemisphere realizes the properties of the first particles of the first kind $P_A$, and the light-scattering/reflecting second hemisphere realizes the properties of the second particles of the second kind $P_B$.

Janus particles suitable to be used in the invented optical element can, for example, configured in the following way: a) as mentioned above, as a transparent sphere (polystyrene, melamine resin or silica) or a scattering sphere with an absorbing hemisphere; b) a colored or black sphere with a reflecting hemisphere; and c) a sphere with one reflecting and one absorbing hemisphere.

A scattering sphere can be implemented, e.g., by means of $TiO_2$ nanoparticles or silica nanoparticles in a polystyrene sphere. In general, all suitable materials that scatter or reflect white light are conceivable. A refractive index contrast of the nanoparticles employed relative to the sphere material of the Janus particles renders the transparent sphere scattering.

To implement the Janus particles, it is, it is alternatively possible to use a colored or black sphere consisting, e.g. of polystyrene and filled with absorbing nanoparticles, quantum dots or dyes. The examples therefor are the same as for the particles $P_A$. A chromium (IV) oxide sphere with ferromagnetic properties can also be used.

The reflecting hemisphere can be implemented, e.g., by means of a filter or nanoparticles of aluminum, chromium, silver or other metals, as described for the second particles of the second kind $P_B$. Eligible for the absorbing hemisphere are, for example, carbon, chromium (IV) oxide, $Fe_2O_3$, $Fe_3O_4$ or FeO as a film, or nanoparticles as described for $P_B$ The electrophoretic properties are determined by the properties of the surfaces. These can be improved, or controlled, b a surface functionalization. To make the Janus particles magnetophoretic, either the sphere itself, i.e. its material, or one of the hemispheres, i.e., the surface coating in this hemisphere must be magnetophoretic. Magnetic materials are, e.g., nickel, iron or chromium (IV) oxide. When selecting materials, one should make sure that the magnetic dipoles of the spheres are permanent, so that the Janus particles can be rotated in a directed manner. This can be achieved, e.g., with ferromagnetic Janus particles.

Normally, the diameter of the Janus particles is more than 200 nm, and the thickness of the layers coated is more than 10 nm; these dimensions, however, may also be greater or smaller. In addition, it is advantageous if all particles P involved are provided with a surface functionalization with a high zeta potential, on the one hand, as a stabilization in the liquid or the skeleton matrix and, on the other hand, an improvement of the electrophoresis, i.e., a preference of electrophoresis, if the particles are electrophoretically movable. For water-based systems, this can be implemented, e.g., with PVP (polyvinyl pyrrolidone) or PEG (polyethylene glycol). In case of the second, third and fourth alternatives, the optical element comprises a multiplicity of chambers embedded in the substrate, these chambers, depending on their size, either form a single louver or are gathered in groups with each group forming a louver. The chambers, configured in a louver fashion either individually or in groups, and having long sides and narrow sides extending between the first large surface and the second large surface, can be aligned, e.g., parallel to the large surfaces and have a cuboid form. It is also possible, however, for the narrow sides to be trapezoidal or curved, e.g., in an arched manner. "Configured in a louver fashion" is understood to mean that the dimension along the long sides is substantially greater than that along the narrow sides, similar to the teeth of a comb or the louvers of Venetian blinds. Usually, a number of louvers are arranged parallel to each other also along their longitudinal direction; but a grid-like arrangement is feasible as well.

In case of the cuboid form—excluding the special case of a cube—, the narrow sides are the oblong sides that have a smaller surface area than the long sides, which, as a rule, have the greatest surface area of all six surfaces of a chamber. Typically, the narrow sides are arranged parallel, or parallel excepting a tilt angle described below, to the large surfaces of the substrate, whereas the long sides are arranged perpendicularly, or perpendicularly excepting the tilt angle, to the large surfaces of the substrate. Compared with this, the remaining end faces are those two surfaces that embody neither narrow nor long sides. Furthermore, it is explicitly possible for the chambers to jut out at least partially from one or both large surfaces of the substrate.

Advantageously, the chambers are filled with a skeleton matrix which is fashioned as a polymer matrix, e.g., a gel matrix. Such a polymer matrix has a characteristic mesh size. Due to that mesh size, small particles P sense less "resistance" than big particles P; hence, small and big particles P move at differing speeds. One advantage thereof is that it enables the switching times to be controlled and the homogeneous distribution of the particles P to be accelerated if they are fashioned as first particles of the first kind $P_A$ and second particles of the second kind $P_B$; for capsules and Janus particles this is irrelevant, though. Another advantage of such a polymer matrix is that it greatly impedes the diffusion so that the particles P will not move of their own accord, which is advantageous for the capsules. If the chambers are filled with a liquid, it is necessary, in case of scattering particles P, to have a refractive index contrast relative to the liquid F. The liquid in the chambers may have or not have a polarity. Further, it may predominantly consist, e.g., of water, oil, toluene or formaldehyde, and may possibly be mixed with electrolytes.

The electromagnetic switching means provided in the substrate in planar fashion one or several sides of the fluid chambers in case of the second to fourth alternatives are arranged, e.g., on the narrow sides of the respective chambers.

In all alternatives, preferably either the particles P are electrically charged, with the electromagnetic switching means being configured as electrodes for generating a static or dynamic electric field, or the particles are magnetic, especially para- or superparamagnetic, in which case the electromagnetic switching means are configured as electrically conducting for generating a static or dynamic magnetic field. Applying an electric or magnetic field causes the electro- or magnetophoretic particles in the electric or magnetic field in the liquid or skeleton matrix to move. With a homogeneous electric field applied, e.g., the electric field lines, are then, in case of the second to fourth alternative, established at the center of a chamber or, in case of the first alternative, are established in parallel fashion between two electrodes located on the large surfaces and facing each other, and tend to deviate from parallelism on the margin. Other configurations are possible as well.

Dominating physical effects for the motion of the particles upon the application of an electro-magnetic field, especially of a static field, are (di-)electrophoresis or magnetophoresis. In the case that no electric or no magnetic field is applied, the particles move especially because of diffusion in the chambers and thus are distributed homogeneously in the course of time. Also, with particles not bigger than 50 nm, gravity does not play a part; these particles, therefore, do not get sedimented; they do not change their vertical position in the chamber in case of the second to fourth alternative, or in the optical element in case of the first alternative, i.e., the particles remain suspended in the liquid or the gel matrix.

In case of the first, third or fourth alternative, the electrodes can be arranged parallel, perpendicularly or at another defined angle relative to the first large surface of the substrate S. In case of the third alternative, according to which the particles P comprise first particles $P_A$ and/or second particles $P_B$, the first particles $P_A$ and the second particles $P_B$ can execute a translational motion along the electric or magnetic field. In case of the fourth alternative, if the particles P are fashioned as Janus particles, the motion is preferably a rotational motion about a specified axis that is parallel to a long or a narrow side of the louver.

By means of the electromagnetic switching means and a trigger circuit, at least two operating states are defined, wherein, in an angular range of more than 30° to 90° relative to a normal to the second large surface of the substrate, the angle-dependent transmission is more than 50% in a first operating state B1, and, less than 50% in a second operating state B2.

In case of the first alternative, the angular range is measured, e.g., within a plane that includes the vertical bisector as the normal to its surface, i.e., a normal to the second large surface of the substrate S and, as seen by the viewer, has a horizontal position, i.e., generally occupies a position in which the eyes of the viewer are positioned in the said plane or the line connecting the viewer's eyes is parallel to that plane. This definition applies also to the subsequent considerations. In case of the second to fourth alternatives, the angular range is measured rather in a direction normal to a lengthwise extension of the louver-shaped chambers or of the louvers. This direction, too, generally occupies such a position that the viewer's eyes lie in a plane that includes this direction, or that the line connecting the viewer's eyes is parallel to that plane. The lengthwise extension her is defined by the straight line connecting the centroids of the two end faces of each chamber or louver.

In that sense, then, the angular range comprises the angles from +/−30° to +/−90° (i.e., from −90° to −30° and simultaneously from +30° to +90°, but not between −30° and +30°) in the said plane. The angular range may also be varied and comprise, instead of from +/−30°, the range from +/−10° to +/−90°, +/−20° to +/−90°, +/−45° to +/−90° or +/−25° to +/−90°. In case of 90°, the angle lies on the surface of the substrate.

It is likewise within the scope of the invention that more than two operating states B1, B2, B3 etc. can be set. For that case, other than in the versions described above for the operating states B1 and B2, one would, e.g., in a third (fourth, fifth, . . . ) operating state, establish an electromagnetic field of a different kind, with the result that the degree of deployment of the particles or particle kinds differs from operating state to operating state, so that altogether three or more different angle-dependent transmittances are obtained. This can be of interest, e.g., for an angle-dependent darkening. After all, such further operating states are merely different configurations of the operating state B2.

In other words: the different operating states B1, B2 differ, in particular, in that the local concentration and location of the particles in the chambers—or, in case of the first alternative, within the substrate—is varied in order to change the transmission properties due to absorption by the particles.

Below, preferable configurations of the various alternative versions are described. Configurations of the first alternative are described first.

For the first alternative, without chamber, a first embodiment is implemented in such a way that a first part of the electromagnetic switching means are configured as planar electrodes E1 on the first and/or second large surface, and a second part of the electromagnetic switching means are configured as electrodes E2 in the form of louvers between the first and the second large surface. The louvers and a normal to the first or second large surface include an angle sized between 0° and 30°. In the first operating state B1, more than 70% of the particles are located at the electrodes E1 and, in the second operating state B2, more than 70% of the particles are located at or near the electrodes E2. The result thereof is that, in an angular range of more than 30° about a normal to the second large surface of the substrate, the angle-dependent transmission amounts to more than 60% in the first operating state B1 and to less than 10% in the second operating state B2; here, the definitions as explained for the first alternative apply.

It is an advantage of this embodiment that it does not require any chambers or similar features for canalizing the liquid or the skeleton matrix and the particles contained therein. The final location of the particles after their movement makes the provision of such chambers unnecessary on principle.

The electrodes E2 may, for example, be configured in stripe form, in which case they are arranged either parallel or grid-like. Accordingly, then, the angle-dependent transmission properties of the optical element will be established considering one plane, or two planes positioned at right angles to each other. It is also possible, however, to configure this version as a single planar electrode, e.g. consisting of honeycombs covering its surface, wherein the said honeycombs can be triggered jointly as well as separately.

The electrodes E2 in the form of louvers may, on the one hand, all be aligned at the same angle relative to the second large surface of the substrate, especially mainly parallel to the vertical bisector of the substrate.

On the other hand, it is also possible for the electrodes E2 to be inclined relative to the vertical bisector of the substrate within an angular range ("tilt angle") of between −10° and +10° or, if need be, even between −30° and +30°, e.g., in order to create some focusing effect of the louvers for a viewer positioned in front of the device. This embodiment, too, has an influence on the angle dependence of the transmission of the optical element, especially in the operating state B2. Due to the said tilt angle, the angle dependence caused by the particle absorption and the particle positions corresponding to the electrode form and electrode positions of the chambers e angle-dependent absorption is tilted by a fixed offset angle, e.g., if a slight transmission in an especially steep angle is desired.

The louver forms of the electrodes E2 can, for example, have a height of minimally 5 μm and maximally 300 μm, measured in a plane normal to the second large surface of the substrate. Departures from these typical dimensions are possible and come within the scope of the invention.

In a variation of this first embodiment, chamber-like louvers for receiving the liquid or the skeleton matrix may optionally be provided, with particular preference, parallel to the electrodes E2. This will reduce the pressure sensitivity of the optical element, because the particles cannot be moved to a great distance from the electrodes E2 if pressure is exerted on the optical element. A second embodiment of the first alternative of the invention, on the other hand, is designed in such a way that all electromagnetic switching means are configured as planar electrodes EPN on the first and the second large surface, with their polarity being reversible between positive and negative. In the first operating state B1, then, the electrodes EPN on the first large surface have a positive, and the electrodes EPN on the second large surface have a negative polarity, or vice versa. In that way, more than 70% of the particles are located not farther away from the electrodes EPN than maximally a quarter of the thickness of the liquid or the skeleton matrix, and/or diffusely distributed in the liquid or the skeleton matrix. In the second operating state B2, seen along a normal to the first or second large surface, electrodes EPN of negative polarity on the first large surface are located opposite electrodes EPN of negative polarity on the second large surface, and electrodes EPN of positive polarity on the first large surface are located opposite electrodes EPN of positive polarity on the second large surface. Here, along a preferred direction, on either of the large surfaces, an electrode EPN of negative polarity is arranged between two electrodes EPN of positive polarity, and an electrode EPN of positive polarity is arranged between two electrodes EPN of negative polarity. In that way, more than 70% of the particles are each located between electrodes EPN of the same polarity, whereby the angle-dependent transmission amounts to more than 60% in the first operating state B1, and less than 5% in the second operating state B2. This applies in an angular range of preferably +/−30° to +/−90° (that is, from −90° to −30° and, at the same time, +30° to +90°, but not between −30° and +30°), with reference to a normal to the second large surface of the substrate and measured in a direction normal to a length extension of the electrodes EPN. The angular range may be varied, instead of from +/−30° comprising the range from +/−10° to +/−90°, +/−20° to +/−90°, +/−45° to +/−90° or +/−25° to +/−90°. Here, the said preferred direction may be arranged, e.g., parallel to the second large surface of the substrate aligned in a horizontal position as seen by a viewer positioned in front of the optical element, as explained above.

In a third embodiment of the first alternative, the liquid or skeleton matrix F contains further particles $P_C$ in addition to the particles P, wherein the further particles $P_C$ reflect and/or scatter and/or transmit light of one or several wavelengths or wavelength ranges, in contrast to the particles P, which absorb the light. Here, all electromagnetic switching means are configured as planar electrodes EPN having reversible positive and negative polarities, and are arranged on the first and the second large surface. Seen along a normal to the first or second large surface, on the first large surface are located opposite electrodes EPN of negative polarity on the second large surface, and electrodes EPN of positive polarity on the first large surface are located opposite electrodes EPN of positive polarity on the second large surface. In a preferred direction—as already defined above—, an electrode EPN of negative polarity is, on either of the large surfaces, arranged between two electrodes EPN of positive polarity, and an electrode EPN of positive polarity is arranged between two electrodes EPN of negative polarity, unless a blank space without an electrode is arranged between two electrodes EPN of positive polarity or two electrodes EPN of negative polarity. The blank spaces are arranged periodically. The particles P have one polarity each, whereas the further particles $P_C$ each have electric charges of the other polarity In both operating states B1 and B2, more than 70% of the particles P are each located between the electrodes EPN of positive polarity and, complementarily thereto, more than 70% of the further particles $P_C$ are each located between the electrodes EPN of negative polarity, or vice versa. In the first operating state B1, the further particles $P_C$ are each located between electrodes of the same polarity, each of which borders on a blank space, whereas in the second operating state B2, the particles P are each located between electrodes of the same polarity, each of which borders on a blank space. In that way it is achieved that, in an angular range of more than 30° about a normal to the second large surface of the substrate, the angle-dependent transmission amounts to more than 60% in the first operating state B1, and to less than 5% in the second operating state B2. That angle can be varied, amounting, e.g., to 10°, 20° or 25°; for the angular ranges, the comments made above on the first alternative apply analogously.

Electrophoretically movable, light-scattering further particles $P_C$ may be made of polystyrene, melamine resin or silica, with particle sizes between 20 nm and 10 μm, and/or the further, light-reflecting particles $P_C$ may be silver nanoparticles, with particle sizes between 10 nm and 50 nm. For a magnetophoresis of such further particles $P_C$, these must have paramagnetic properties. This can be achieved in that paramagnetic particles are incorporated in the further particles $P_C$. For this purpose, one can use, e.g., nickel nanoparticles, with which the further particles $P_C$ can be interspersed and/or coated.

In a technically equivalent version of this third embodiment, louver-shaped chambers, arranged in a louver-like fashion, can be provided that contain a light-scattering gel matrix $F_S$ replacing the further particles $P_C$, i.e., the chambers are used instead of the further particles $P_C$. Within this scattering gel matrix $F_S$, the particles P can move to and fro, depending on the operating state.

A first modification of this first alternative, which uses chambers assembled into louvers, comprises an essentially planar substrate S with a first large surface configured as a light entrance surface and a second large surface configured as a light exit surface. In addition, it comprises a multiplicity of chambers embedded in the substrate S, these chambers, depending on their size, either forming a louver each or being gathered into groups with each group forming a louver. Each louver has long sides and narrow siders, which extend between the first large surface and the second large surface, with the narrow sides of each louver being arranged in the region of the large surfaces, and the long sides connecting the large surfaces. As a special feature of this embodiment, the spaces between den louvers contain at least one opaque material, i.e. a material not transmitting visible light. The chambers are filled with a liquid or a skeleton matrix containing up to 50 volume percent, preferably up to 20 volume percent, electrophoretically or magnetophoretically movable further particles $P_C$, which reflect and/or scatter, and possibly transmit, light of one or several wavelengths or wavelength ranges in a region visible to a human eye, and deflect it by refraction or diffraction. Configured in the substrate on the narrow sides of the louvers, there are electromagnetic switching means, which in a switched-on state generate an electromagnetic field effective in the louvers, whereby the further particles $P_C$ are moved in the liquid or the skeleton matrix. This affects a change of an angle-dependent transmission, by the optical element, of light of wavelengths or wavelength ranges that enters the substrate through the light entrance surface at angles that make it hit the louvers, and that is reflected and/or scattered by the further particles $P_C$.

In this first modification of the first alternative, in a first state B1, preferably at least 70% of the further particles $P_C$ are arranged near the upper narrow sides of the louvers. Thereby, the light, restricted as to its propagation direction due to the opaque material between the louvers. Entering the substrate through the light entrance side and propagating within the louvers, the light is scattered and/or reflected on its upper narrow sides by means of the further particles $P_C$ in a multiplicity of directions. In a second state B2, at least 70% of the further particles $P_C$ are arranged near the lower narrow sides of the louvers, whereby, on account of the effect of the further particles $P_C$, the light entering the substrate through the light entrance side is, while being scattered and/or reflected, restricted as to its propagation direction by the opaque material between den louvers. A second modification of this first alternative, intended for special application cases, also comprises a planar substrate with a first large surface configured as a light entrance surface and a large surface configured as a light exit surface. Furthermore, it comprises a liquid or a skeleton matrix arranged between the first and the second large surface and containing up to 60 volume percent electrophoretically or magnetophoretically movable particles P, which absorb or scatter light of one or several wavelengths or wavelength ranges. The particles are provided in a large number. This second modification of the first alternative further comprises electromagnetic switching means, which are configured in planar fashion on one or both large surfaces and/or in the substrate between the large surfaces, and which, in a switched-on state, generate an electromagnetic field that is effective between the large surfaces, whereby the particles are moved in the liquid or in the skeleton matrix. This changes the transmission by the optical element of light of the wavelengths or wavelength ranges absorbed by the particles, wherein he transmission amounts to more than 50% in a first operating state B1 and less than 50% in a second operating state B2, with reference to the direction of the normal to the second large surface of the substrate.

In this case, the electromagnetic switching means can, for example, be of honeycomb, cylindrical or rectangular shape and fill essentially the entire substrate or part of it.

This second modification of the first alternative of the optical element is particularly applicable to control the vertical and, in combination and simultaneously therewith, also the non-vertical light passage with regard to transmission. One of the application cases, for example, is the complete or partial darkening of glass panes in a car in order to prevent dazzling of the driver in certain situations. In this case, the optical element may be planar and flat, or also have a curved surface, e.g., as part of the windscreen. Moreover, the optical element can be used to implement, e.g., switchable mirrors.

Below, various preferred configurations of the second alternative of the invention are described, which hereinafter are also referred to as fluid chambers.

In a preferred development of this second alternative it applies that in the first operating state B1 more than 70% of the particles are located in regions on those sides of the fluid chambers on which the electromagnetic switching means are configured. In the second operating state B2, in which the switching means are configured in such a way that there is no static electromagnetic field or that there is an alternating electromagnetic field, more than 50% of the particles are predominantly evenly distributed in the fluid chambers, primarily due to diffusion and/or the alternating electromagnetic field. Thereby, the angle-dependent transmission is more than 60% in the first operating state B1 and less than 5% in the second operating state B2. This applies, on the other hand, in an angular range of more than 30°. This angle may be varied and may amount, e.g., 10°, 20° or 25°, each with reference to a normal to the second large surface of the substrate and measured in a direction normal to a lengthwise extension of the louver-shaped fluid chambers. Here, the above comments on the angular ranges in case of the second to fourth alternatives apply.

In a first modification of the second alternative for special applications, the optical element comprises an essentially planar substrate with a first large surface configured as a light entrance surface and a second large surface configured as a light exit surface, plus a multiplicity of fluid chambers embedded in the substrate, each with one or several surfaces. The fluid chambers are filled with a liquid containing up to 20 volume percent electrophoretically or magnetophoretically movable particles, which absorb or scatter light of one or several wavelengths or wavelength ranges. On one or several surfaces of the fluid chambers in the substrate, electromagnetic switching means are configured, which in a switched-on state generate an electromagnetic field in the fluid chambers, which is effective in the fluid chambers. Thereby the particles in the liquid are moved, which changes the transmission by the optical element of light of the wavelengths or wavelength ranges that are absorbed by the particles. Here, the transmission is more than 50% in a first operating state B1 and less than 50% in a second operating state B2, with reference to the direction of the normal to the second large surface of the substrate.

In this case, the fluid chambers can, for example, be of honeycomb, cylindrical or rectangular shape and fill essentially the entire substrate or part of it. Like the second modification of the first alternative, this first modification of the second alternative of the optical element is applicable especially to control the vertical light passage, but in combination and simultaneously therewith also the non-vertical light passage with regard to transmission. One application case, for example, would be the complete or partial darkening of glass panes in a car in order to prevent dazzling of the driver in certain situations. Moreover, the optical element can be used to implement, e.g., obscurable mirrors.

The following section describes preferred configurations of the third and the fourth alternative.

For an application in which the particles P comprise first particles $P_A$ and second particles $P_B$, e.g. more than 70% of the first particles $P_A$ in the second operating state B2, and for the case that the particles P are configured as Janus particles, more than 70% of the first structures $P_1$ of the particles P are located on the long sides of the louvers. In case of the first structures $P_1$, these are facing the long sides, whereas the second structures $P_2$ are facing away from the long sides. In the first operating state B1, by contrast, more than 70% of the second particles $P_B$ or of the second structures $P_2$ of the particles P, respectively, are located on the long sides of the louvers. In case of the second structures $P_2$, these are facing the long sides, whereas the first structures $P_1$ are facing away from the long sides. As a consequence, the angle-dependent transmission, in an angular range of more than 30, referenced to a normal to the second large surface of the substrate and measured in a direction normal to a lengthwise extension of the louvers, amounts to more than 60% in the first operating state B1 and less than 5% in the second operating state. Regarding the angular ranges, the comments made already above apply.

Otherwise, it is also possible that, in the first operating state B1, more than 70% of the first particles $P_A$ or of the first structures $P_1$ of the particles P are located on the narrow sides of the louvers, wherein, in case of the first structures $P_1$, these are facing the narrow sides, whereas the second structures $P_2$ are facing away from the narrow sides. In the second operating state B2, then, more than 70% of the second particles $P_B$ or of the second structures $P_2$ of the particles P are located on the narrow sides of the louvers, wherein, in case of the second structures $P_1$, these are facing the narrow sides, whereas the first structures $P_2$ are facing away from the narrow sides. As a consequence, the angle-dependent transmission, in an angular range of more than 30° referenced to a normal to the second large surface of the substrate and measured in a direction normal to a lengthwise extension of the louver, is more than 60% in the first operating state B1 and less than 5% in the second operating state B2, To the second to fourth alternatives it also applies that, in case that electromagnetic switching means are configured in planar fashion only on one surface of each of the chambers in the substrate, these can, in a switched-on state, generate an electromagnetic field in the chambers that is effective within the chambers and resembles an electromagnetic field employed in IPS ("in-plane switching") LCD panels.

Preferably, for all four alternatives including their modifications, the electromagnetic switching means are, in a wavelength range visible to a human eye, transparent to at least 50% of the light incident at right angles to the substrate S through the light entrance surface. This may, for example, be the case with a layer of indium tin oxide (ITO).

Likewise, in all four alternatives including their modifications, the electromagnetic switching means—as also the fluid chambers, if provided—can be divided up into several, separately switchable segments, thus enabling local switchability between the first operating state B1 and the second operating state B2. Here, local switchability means that the change between operating states B1 and B2 is not performed in all chambers simultaneously, but rather that regions with both operating states B1 and B2 are present on the optical element at a time. This is advantageous, e.g., if the optical element is used in front of a screen and, from a viewing angle of more than 30 degrees sideways, parts of the image content displayed are to be visible and other parts to be invisible.

In another advantageous embodiment, the liquid contains several kinds of particles that differ by their absorption properties—or reflection, scattering or transmission properties—and/or their transport properties in the electromagnetic field. The term "transport properties" means, in particular, the behavior of the particles in (di-)electro- or magnetophoresis, i.e., during transport in the field. This version takes effect especially in case of nanoparticles: here, the difference between the particle kinds consists, e.g., in the particle size and/or the surface function, i.e., the zeta potential. In case of the use of quantum dots or dyes as particles, and if they are fluorescent, it is preferable to additionally employ a so-called quencher material in order to avoid fluorescence.

If the optical element is provided with chambers or louvers, as in the second to fourth alternatives, the louvers or chambers may either be aligned in parallel or arranged in a grid fashion with regions crossing each other. Accordingly, then, the angle-dependent transmission properties of the optical element will take shape as against one or two planes perpendicularly to each other. In the preferred case of application, the chambers—especially their long sides—are each aligned parallel to the vertical bisector of the substrate.

Compared with this, it is also possible for the chambers to be inclined relative to the vertical bisector of the substrate in an angular range ("tilt angle") from −30° to +30°, or possibly even between −30° and +30°. This embodiment, too, exerts an influence on the angle dependence of the transmission of the optical element, especially in the operating state B2. Because of the said tilt angle, the angle-dependent absorption caused by the particle absorption and the particle positions within the chambers is inclined by a fixed offset angle, e.g., if a low transmission at a particularly steep angle is desired. In particular, however, the optimum viewing angle of 0° in the restricted mode is also inclined by the tilt angle, which can be an advantage, e.g., in case of cash registers. or of display screens in vehicles.

For example, the fluid chambers configured in louver fashion may, in a first plane parallel to the direction of the greatest dimension of the substrate, have a width between 2 μm and 30 μm (distance between the long sides of a fluid chamber) and be spaced from each other by minimally 10 μm and maximally 150 μm (spacing between a long side of one fluid chamber and the nearest long side of the nearest adjacent fluid chamber. Finally, the chambers configured in louver fashion R may have a height (distance between the two narrow sides) of minimally 10 μm and maximally 300 μm, measured in a plane perpendicular to the first plane. Deviations from these typical sizes are possible, though, and are within the scope of the invention.

The invention gains particular importance when the optical element according to the first, second, third or fourth alternative including their modifications is used in a screen that can be operated in a first operating state B1 for a free viewing mode and a second operating state B2 for a restricted viewing mode. Such a screen comprises at least an optical element a described above and an image display device arranged (as seen by a viewer) behind or in front of the optical element. The use of two stacked optical elements of preferably like configuration improves perception in the operating state B2. It is particularly advantageous if the optical elements, while being alike, have louvers, chambers, etc. arranged in positions mutually rotated by a specified angle in the plane of one of the large surfaces or as seen in the top view of the screen. The specified plain angle may amount to up to 25°, with 16° being the preferable size.

The image display device may be, e.g., an OLED display, an LCD, an SED, a FED, a micro-LED display or a VFD. As the optical element is effective irrespective of the kind of the image display device, any other screen types are eligible as well.

Furthermore, it is possible, e.g., to se the invented optical element in an image display device provided with a backlight, such as in an LCD screen. Here, then, the optical element would advantageously be arranged between the image display panel (i.e., the LCD panel) and the backlight, permitting witching between a first operating state B1 for a free viewing mode and a second operating state B2 for a restricted viewing mode, because, due to the optical element, the light of the backlight is focused in one case (B2) and not focused in the other case (B1). "Focusing" here does not refer to the kind of focusing carried out with lenses, but to a constriction of the radiation area according to the respective transmission properties of the invented optical element.

In principle, varying the parameters described above within certain limits will not impair the performance capability of the invention.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail on the basis of exemplary embodiments with reference to the accompanying drawings, which also disclose features essential to the invention. These exemplary embodiments merely serve the purpose of illustration and must not be interpreted as restrictive. For example, a description of an exemplary embodiment featuring a multiplicity of elements or components must not be interpreted in the sense that all these elements or components are needed for an implementation. Rather, other exemplary embodiments may also contain alternative elements and components, fewer elements or components, or additional elements or components. Elements or components of different exemplary embodiments may be combined with each other unless stated otherwise. Modifications and variations described for one of these exemplary embodiments may also be applicable to other exemplary embodiments. To avoid redundancies, similar or mutually corresponding elements in different drawings are designated by the same reference numbers or letters, and explained a single time only. Of the drawings, FIG. 19 is a schematic diagram of two different kinds of particles within a capsule, in connection with a third alternative of an optical element, FIG. 20 shows a first configuration of Janus particles in connection with a fourth alternative of an optical element, FIG. 21 shows a second configuration of Janus particles in connection with a fourth alternative of an optical element, FIG. 22 shows a third configuration of Janus particles in connection with a fourth alternative of an optical element, FIG. 23 is a schematic sectional diagram of the principle of a first embodiment of an optical element according to the third more fourth alternative in an operating state B1.

DETAILED DESCRIPTION OF THE DRAWINGS

The drawings are not to scale and merely illustrate principles. Furthermore, as a rule, for greater clarity, the drawings only show a small selection of electrodes, light rays, particles or the like, although in reality a real multiplicity of these is, or may be, provided. Below, four different alternatives are described which, especially with regard to the condition of the substrate proper and the condition of the particles, have features in common that are not explicitly repeated with each alternative.

Figure 1:
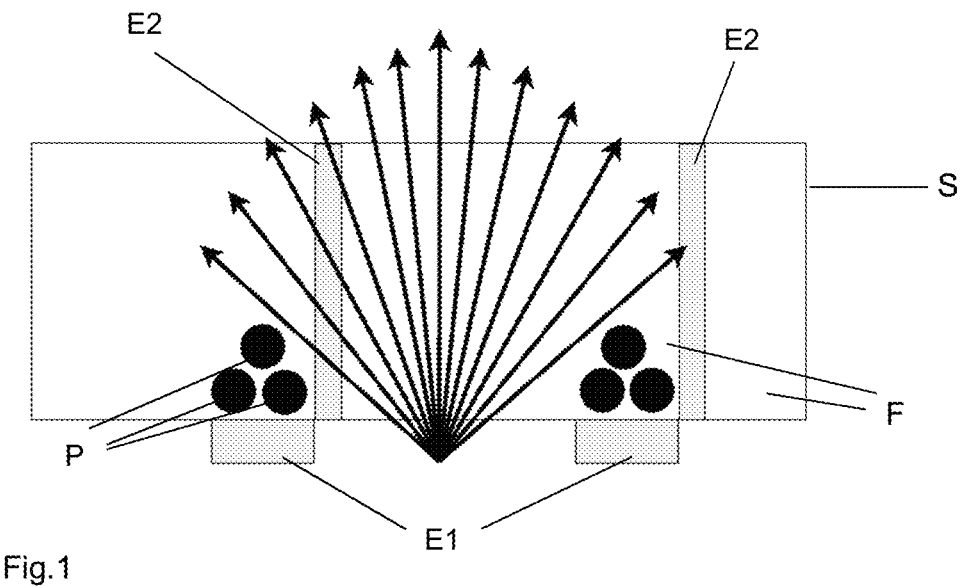
FIG. 1 is a schematic diagram of the principle of an optical element according to a first alternative in a first embodiment in an operating state B1.
Figure 2:
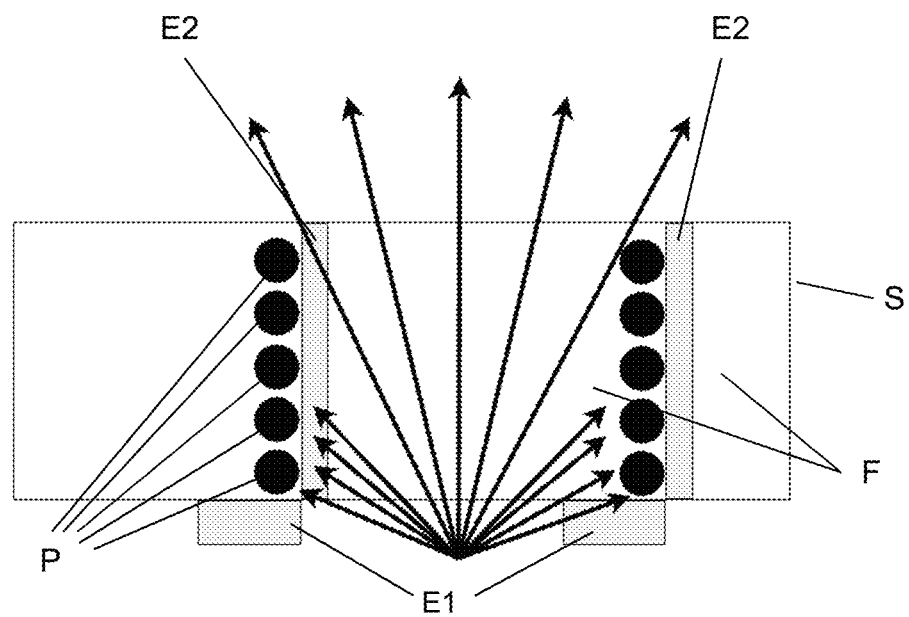
FIG. 2 is a schematic diagram of the principle of an optical element according to the first alternative in a first embodiment in an operating state B2.

FIG. 1 is a schematic diagram of the principle of a first optical element according to a first alternative in a first embodiment in the operating state B1, and FIG. 2 shows the same in the operating state B2. This optical element comprises an essentially planar substrate S with a first large surface adapted as a light entrance surface and a second large surface adapted as a light exit surface. It furthermore comprises a liquid or a skeleton matrix F that is arranged between the first and the second large surface and contains up to 60 volume percent of electrophoretically or magnetophoretically movable particles P, with a multiplicity of particles P existing which absorb light of one or several wavelengths or wavelength ranges. Fashioned on one of the two large surfaces and/or in the substrate S between the large surfaces, there are planar electromagnetic switching means E1, E2, which, in a switched-on state, generate an electromagnetic field effective between the large surfaces, which causes the particles P in the liquid or in the skeleton matrix F to be moved. As a result, there is a change of an angle-dependent transmission by the optical element of light of the wavelengths or wavelength ranges absorbed by the particles P that, through the light entrance surface, enters the substrate S, which acts as a light filter. Above and below the substrate, as a rule, further substrates (not shown here) are arranged, so that the light entrance surface constitutes an interface between the further substrate arranged above and the chamber(s) recessed into the substrate S.

In case of a skeleton matrix F, this is embodied, e.g., as a polymer matrix, preferably as a gel matrix. The liquid F may have, or not have, a polarity. It may further consist, e.g., of water, oil, toluene or formaldehyde and/or be mixed with electrolytes. This analogously applies to all embodiments and alternatives of the optical element, including those described hereinafter.

As seen by a viewer, the first large surface of the planar substrate S adapted as a light entrance surface, which may consist, e.g., of glass or a polymer, is located, as a rule, on the rear side of the substrate S and, depending on the kind of application, borders on an image display device, a light source, or a volume of air, for example. From the last-named objects, then, light enters the substrate through the said light entrance surface.

As shown in FIG. 1, a first part of the electromagnetic switching means is configured as planar electrodes E1 on the first large surface, and a second part of the electromagnetic switching means as electrodes E2 in the form of louvers between the first and the second large surface.

Generally, the louvers and a normal to the first or second large surface enclose an angle between 0° and 30°, here 0°. In the first operating state B1, more than 70% of the particles P are located on the electrodes E1. Thus, light incident on the light entrance side of the substrate S—the bottom edge in the drawing—, can, within the angle of propagation, penetrate the optical element almost without any obstruction, as suggested by the arrows in FIG. 1. Here, in an angular range of more than 30° about a normal to the second large surface of the substrate S, the angle-dependent transmission in the first operating state B1 is more than 60%. The angular range about a normal to a surface can be measured, e.g., within a plane that contains the vertical bisector as a normal to the surface, i.e., that is perpendicularly on the second large surface of the substrate S, and extends horizontally as seen by a viewer.

The second operating state B2 is shown in FIG. 2. Here, more than 70% of the particles P are located on, or near, the electrodes E2, so that, in an angular range of more than 30° about a normal to the second large surface of the substrate S, the angle-dependent transmission is less than 10%. This is also shown by the arrows. Some of them end at the particles P, which symbolizes the absorption. One advantage of this embodiment is that no chambers or similar features are required for channeling the liquid or the skeleton matrix F and the particles P contained therein. The final location of the particles P on the electrodes E1 or E2, respectively, after the particle motions makes the provision of such chambers generally unnecessary The louvers for the electrodes E2 may be either parallel or crossing each in a grid pattern. Accordingly, then, the angle-dependent transmission properties of the optical element will be fashioned relative to one plane, or two mutually perpendicular planes. The electrodes E2 in the form of louvers may, on the one hand, all be aligned at the same angle relative to the second large surface of the substrate S, in particular, essentially parallel to the vertical bisector of the substrate S. On the other hand, though, it is also possible for the chambers to be inclined relative to the vertical bisector of the substrate at an angular range (tilt angle") from −10° to +10°, possibly even between −30° and +30°, say, in order to create some kind of focus effect of the louvers for a viewer located in front of them. This embodiment, too, has an influence on the angle dependence of the transmission of the optical element, especially in the operating state B2. On account of the said tilt angle, the angle-dependent absorption caused by the particle absorption and the particle positions according to the electrode form and electrode positions of the chambers is tilted by a fixed offset angle, e.g. if low transmission at a particularly steep angle is desired.

For example, louver forms of the E2 may have a height of minimally 5 μm and maximally 300 μm, measured in a plane normal to the second large surface of the substrate S. The width of the may E1 may have similar dimensions.

The following explanations, which mainly describe the embodiment of the substrate proper and the composition of the particles, apply not only to the first alternative, but also to the second, third or fourth alternative, which are described further below. The one or several wavelengths or wavelength ranges, in which the electrophoretically or magnetophoretically movable particles P absorb light, are preferably in the visible spectrum and with particular preference cover that spectrum completely.

The first and the second large surface of the planar substrate S are preferably arranged in parallel. In special embodiments, however, e.g., if it is intended to attain special angle-dependent transmissions of the optical element, they may also be non-parallel, e.g., wedge-shaped at a defined angle of 20 degrees relative to each other.

The particles P may be nanoparticles, quantum dots and/or dyes with spatial extensions from maximally 200 nm down to maximally 20 nm. Spatial extension here is understood to mean the maximum extension in the three-dimensional space, or the hydrodynamic radius, whatever is greater. In spherical particles, then, this is the diameter. In chain-like particles it is the greatest distance two dots on the particle surface can have from each other. The particles P can be configured as BPQDs (black phosphorus quantum dots), lead sulfide (PbS), CdTeSeS quantum dots, azo dyes and/or metal oxide particles, consisting preferably of chromium (IV) oxide or $Fe_2O_3$, and have sizes between 2 nm and 50 nm, including these limits.

Alternatively, an embodiment as paramagnetic bodies is possible as well, e.g., as spheres at least 100 nm in diameter, made of a paramagnetic or diamagnetic carrier material with a relative magnetic permeability between 0,5 and 2, preferably of melamine resin or polystyrene, wherein the relative magnetic permeability should preferably be 1 or close to 1. The bodies are then coated, e.g., either with paramagnetic or superparamagnetic nanoparticles having a relative magnetic permeability greater than 10, preferably $Fe_2O_3$ nanoparticles, or the carrier material is interspersed with those nanoparticles. A surface functionalization with a high zeta potential is also advantageous. Either the particles P are electrically charged and the electromagnetic switching means are adapted to generate a static or dynamic electric field, or the particles P are para- or superparamagnetic, and the electromagnetic switching means are configured as electrically conducting layers adapted to generate static or dynamic magnetic, so that the electro- or magnetophoretic particles P move in the electric or magnetic field in the liquid or the skeleton matrix F.

Depending on the configuration of the particles, the electromagnetic switching means are configured either as electrodes for generating a static or dynamic electric field, or as electrically conducting layers for generating a static or dynamic magnetic field.

Figure 3:
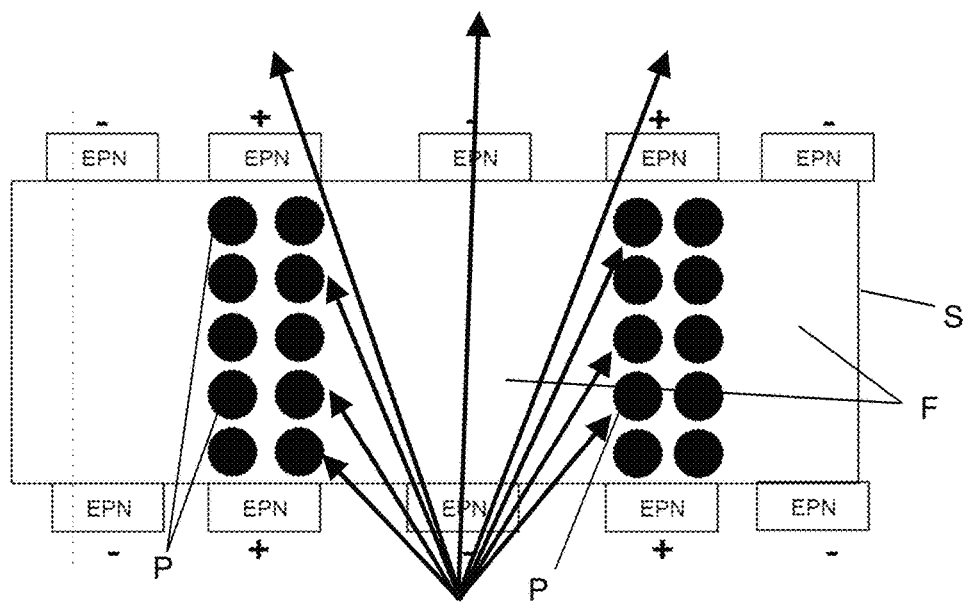
FIG. 3 is a schematic diagram of the principle of an optical element according to the first alternative in a second embodiment in the operating state B1.
Figure 4:
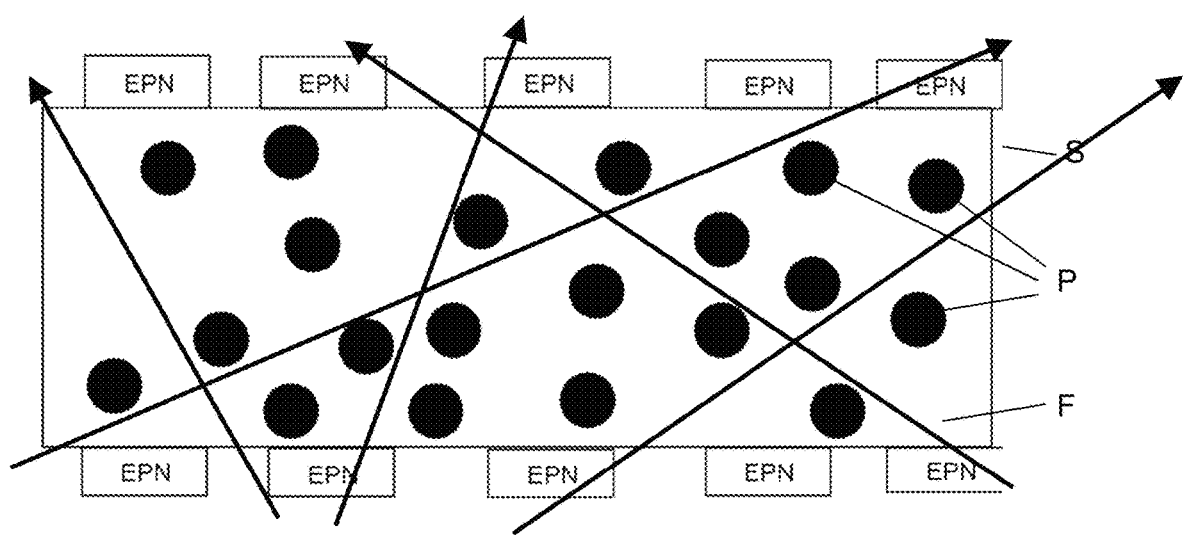
FIG. 4 is a schematic diagram of the principle of an optical element according to the first alternative in a second embodiment in the operating state B1 in a first modification.
Figure 5:
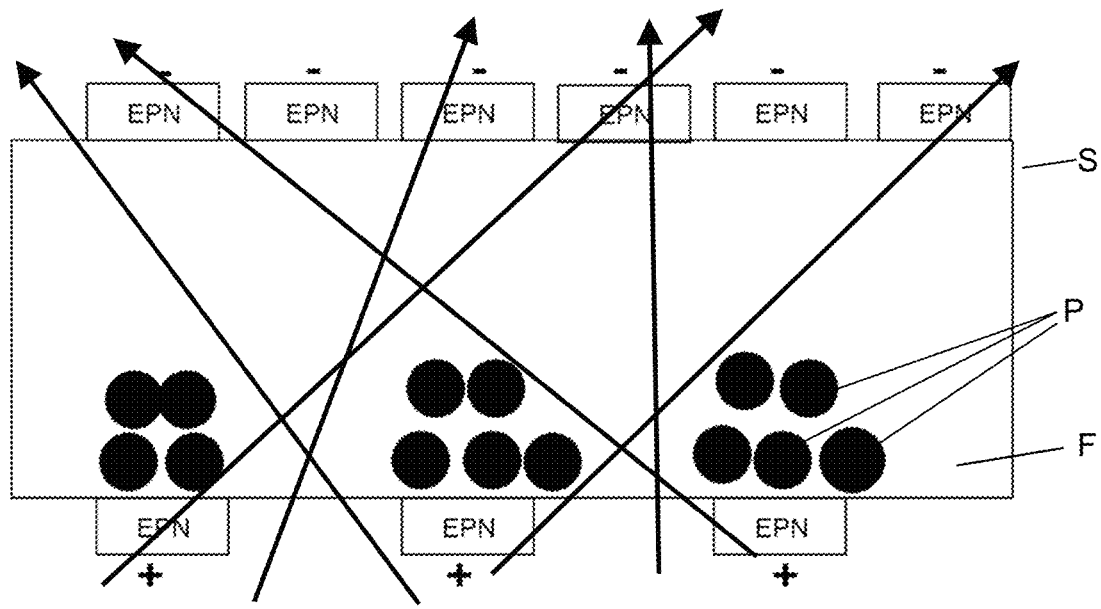
FIG. 5 is a schematic diagram of the principle of an optical element according to the first alternative in a second embodiment in the operating state B1 in a second modification.

A second embodiment of the optical element according to the first alternative is illustrated by FIGS. 3 to 5. In this optical element, all electromagnetic switching means are configured as planar electrodes EPN on the first and the second large surface, with polarities reversible between positive and negative. In the first operating state B1, the electrodes EPN on the first large surface have a positive, and the electrodes EPN on the second large surface have a negative polarity, or vice versa. In that way, more than 70% of the particles P are spaced from the respective electrodes EPN by maximally a quarter of the thickness of the liquid or the matrix F (as shown in FIG. 5) and/or located in the liquid or the skeleton matrix F in a diffuse distribution (as shown in FIG. 4). The arrows represent selected light rays, which substantiate that the light can penetrate the substrate in a large angular range here. In an angular range of more than 30° about a normal to the substrate S, then, the angle-dependent transmission in the first operating state B1 is more than 60%, with the angular range being variable.

FIG. 3 shows the optical element in the operating state B2. Generally, in this embodiment, seen along a normal to the first or second large surface, electrodes EPN of negative polarity on the first large surface are located opposite electrodes EPN of negative polarity on the second large surface, and electrodes EPN of positive polarity on the first large surface are located opposite electrodes EPN of positive polarity on the second large surface. At the same time, along a preferred direction, on either of the large surfaces, an electrode EPN of negative polarity is arranged between two electrodes EPN of positive polarity, and an electrode EPN of positive polarity is arranged between two electrodes EPN of negative polarity, so that more than 70% of the particles of the first kind ($P_A$) are located between electrodes EPN of like polarity. As a result, the angle-dependent transmission in an angular range of more than 30° about a normal to the second large surface of the substrate S is less than 5%. Here, the said preferred direction can, e.g., be aligned parallel to the second large surface of the substrate S and in a horizontal position as seen by a viewer positioned in front of the optical element.

Figure 6:
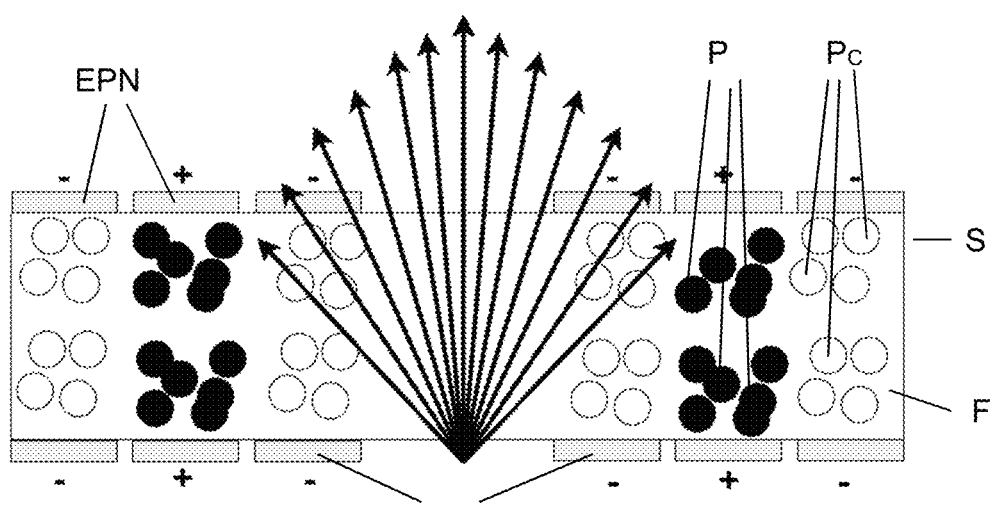
FIG. 6 is a schematic diagram of the principle of an optical element according to the first alternative in a third embodiment in the operating state B1.
Figure 7:
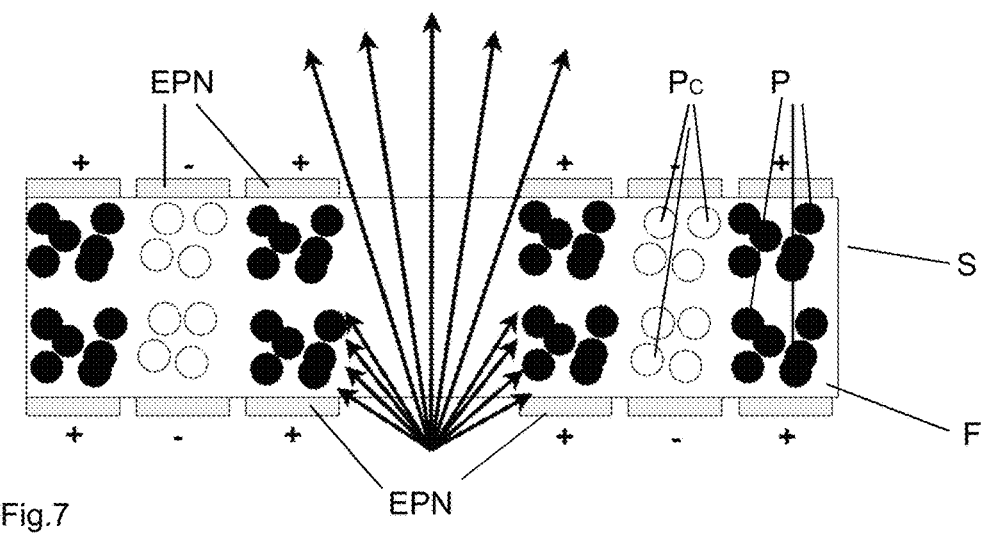
FIG. 7 is a schematic diagram of the principle of an optical element according to the first alternative in a third embodiment in the operating state B2.

FIGS. 6 and 7 are schematic diagrams of the principle of an optical element according to the first alternative in a third embodiment in the operating states B1 and B2, respectively. In addition to the absorbing particles P, the liquid or the skeleton matrix F contains further particles $P_C$, wherein the further particles $P_C$ reflect and/or scatter and/or transmit light of one or several wavelengths or wavelength ranges. Here, all electromagnetic switching means are arranged on the first and the second large surface as planar electrodes EPN of reversible positive and negative polarity, wherein, seen along a normal to the first or second large surface, electrodes EPN of negative polarity on the first large surface are located opposite electrodes EPN of negative polarity on the second large surface, and electrodes EPN of positive polarity on the first large surface are located opposite electrodes EPN of positive polarity on the second large surface, and wherein, in a preferred direction as already defined above, on either of the large surfaces an electrode EPN of negative polarity is arranged between two electrodes EPN of positive polarity, and an electrode EPN of positive polarity, is arranged between two electrodes EPN of negative polarity, unless a blank space (without any electrode) is arranged between two electrodes EPN of positive polarity or between two electrodes EPN of negative polarity, with the blank spaces being arranged in a periodic manner. The particles P have electric charges of one, and the further particles $P_C$ of the other polarity.

In both operating states B1 and B2, more than 70% of the particles P are located between the electrodes EPN of positive polarity and, complementary thereto, more than 70% of the further particles $P_C$ are each located between the electrodes EPN of negative polarity, or vice versa. In the first operating state B1 (see FIG. 6), the further particles $P_C$ are each located between electrodes of like polarity, with each of these bordering on a blank space, whereas in the second operating state B2 (see FIG. 7), the particles P are each located between electrodes of like polarity, with each of these bordering on a blank space. In an angular range of more than 30° about a normal to the second large surface of the substrate S, the angle-dependent transmission is more than 60% in the first operating state B1, and less than 5% in the second operating state B2.

Light incident to the light entry side of the substrate S now can propagate (almost unhindered) especially where, due to the blank spaces, there are no particles P, and where further particles $P_C$ are arranged. In FIG. 6 and FIG. 7, examples of light rays are drawn to illustrate the functionality.

Electrophoretically movable further particles $P_C$, which scatter the light, may be made of polystyrene, melamine resin or silica, with particle sizes between 20 nm and 10 μm. Further particles $P_C$, which reflect the light, may be silver nanoparticles with particle sizes between 10 nm and 50 nm.

For a magnetophoresis of such further particles $P_C$. These must have paramagnetic properties. This can be achieved in that paramagnetic partial particles are incorporated in the further particles $P_C$. For this purpose, one can use nickel nanoparticles, for example.

Moreover, it is feasible here that at least one of the electrodes EPN (e.g., the one in the middle) is advantageously adapted to be reflecting downwards to improve the performance and the efficiency of the optical setup.

Figure 8:
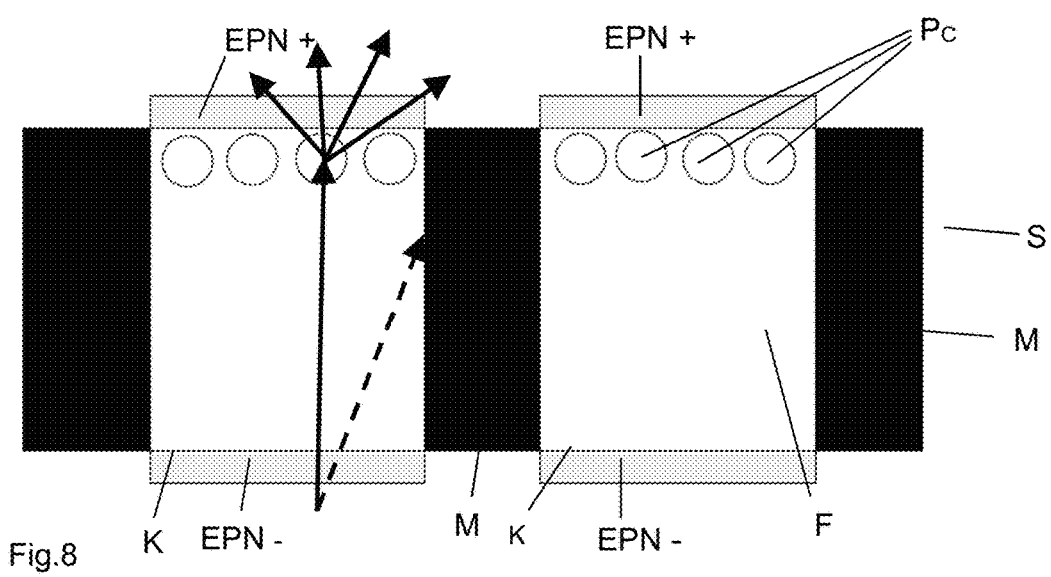
FIG. 8 is a schematic diagram of the principle of an optical element in a first modification of the first alternative in the operating state B1.
Figure 9:
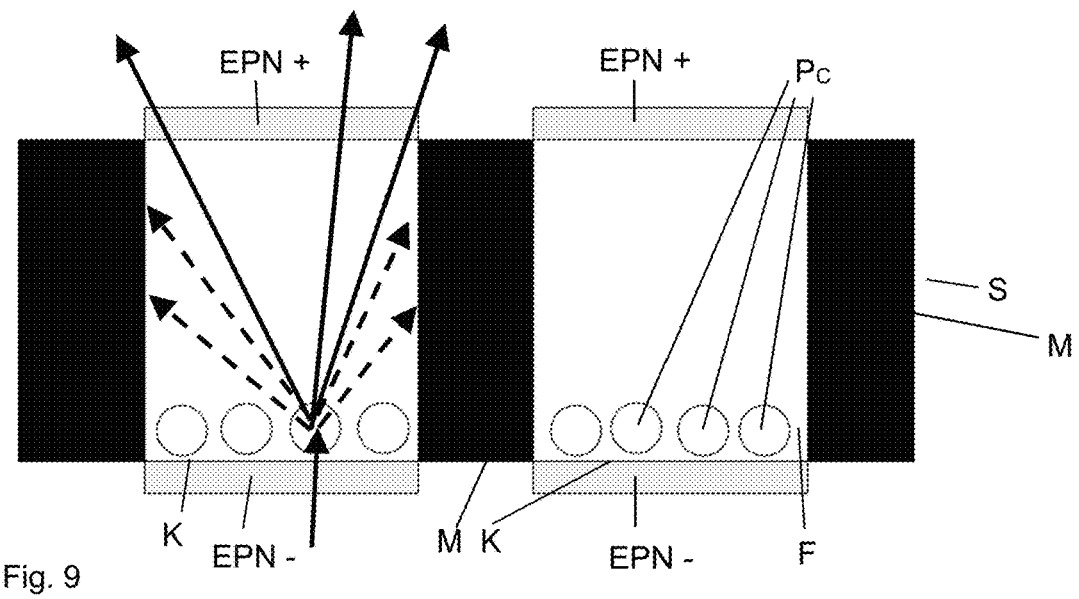
FIG. 9 is a schematic diagram of the principle of an optical element in a first modification of the first alternative in the operating state B2.

FIGS. 8 and 9 are schematic diagrams of the principle of an optical element in a first modification of the first alternative in the operating state B1 and B2, respectively. This optical element, too, comprises an essentially planar substrate S with a first large surface adapted to function as a light entrance surface and a second large surface adapted to function as a light exit surface. The optical element furthermore comprises a multiplicity of chambers K embedded in the substrate S, which, depending on their size, either form a louver each or are gathered in groups, with each group forming a louver. Each louver has long sides and narrow sides extending between the first large surface and the second large surface, and with the narrow sides of each louver being arranged within the area of the large surfaces and with the long sides connecting the large surfaces, and with the spaces between the louvers containing at least one opaque material M. The chambers are filled with a liquid or a skeleton matrix F, with the liquid or the skeleton matrix F containing up to 50 volume percent, preferably up to 20 volume percent of further particles $P_C$, which are electrophoretically or magnetophoretically movable, and which reflect and/or scatter, and possibly also transmit, light of one or several wavelengths or wavelength ranges in the region visible to a human eye, thereby deflecting the light by refraction or diffraction. Fashioned on the narrow sides of the louvers or chambers K, respectively, in or on the substrate S are planar electromagnetic switching means EPN, which in a switched-on state generate an electromagnetic field effective in the louvers, thereby causing the further particles $P_C$ to be moved in the liquid or in the skeleton matrix F. This effects a change of the angle-dependent transmission, by the optical element, of light of the wavelengths or wavelength ranges that enters the substrate through the light entrance surface at angles that make it hit the louvers, and is reflected and/or scattered by the further particles $P_C$t X In the first operating state B1, shown in FIG. 8, at least 70% of the further particles $P_C$ are arranged near the upper narrow sides of the louvers or chambers K, respectively. Thereby, the light, restricted as to its propagation direction due to the opaque material M between den louvers, entering the substrate S through the light entering side and propagated within the louvers, is scattered and/or reflected in a multiplicity of directions at the upper narrow sides of the louvers by means of the further particles $P_C$.

The dashed arrow indicates that certain light rays, in a definable angular range, are absorbed by the opaque material M, which may be blackened silicone, for example. In a second state B2, shown in FIG. 9, at least 70% of the further particles $P_C$ are arranged near the lower narrow sides of the louvers, whereby the light that enters the substrate S through the light entrance side is scattered and/or reflected due to the action of the further particles $P_C$, but is restricted by the opaque material M between the louvers as to its propagation direction.

Figure 10:
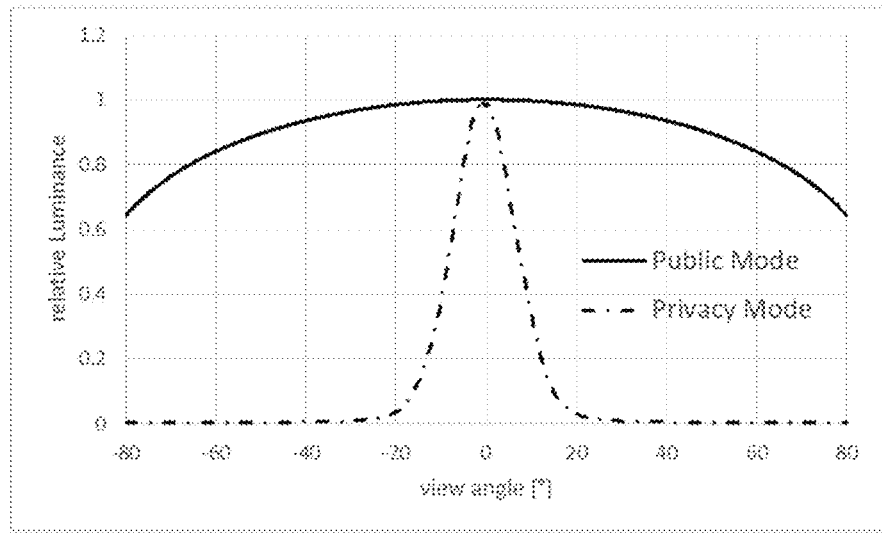
FIG. 10 is a schematic diagram of the principle of the exemplary effect of the optical element of the first alternative and in its modification in both operating states B1 and B2 with regard to transmission at different angles.

For all aforementioned embodiments of the element and all following embodiments—except the embodiments shown in FIGS. 11 to 13 and FIG. 18—FIG. 10 illustrates the principle of the effect in the two operating states B1 and B2 with regard to the transmission at varied angles, especially with regard to the element's effect in front of an image display device. For the sake of simplicity, the ordinate axis shows normalized values. The dashed line and the solid line represent the operating state B2 (privacy mode) and the operating state B1 (public mode), respectively. The ordinate and the abscissa, respectively, represent the relative luminance and the horizontal view angle, i.e., the angle located in a direction perpendicular to the lengthwise extension of the louver. The view angle covers the above-mentioned angular range, i.e., it refers to the normal to the second large surface of the substrate S and is measured in a direction normal to the lengthwise extension of the louver. In case of a screen installed in a motor car, this may be, e.g., the angle in the horizontal plane. The angle-dependent transmission by the optical element of light of the wavelengths or wavelength ranges that are absorbed by the particles P (the said transmission differing in the operating states B1 and B2) makes sure that the image display device in the operating state B1 is visible from all horizontal viewing angles, whereas in the operating state B2 it can be viewed only within a markedly restricted angular range, as illustrated in FIG. 10.

Figure 11:
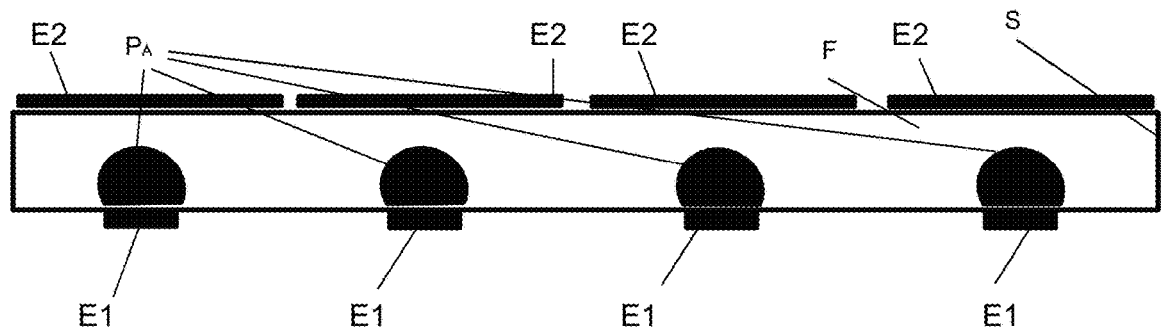
FIG. 11 is a schematic diagram of the principle of the optical element of FIG. 14 according to a second alternative.
Figure 12:
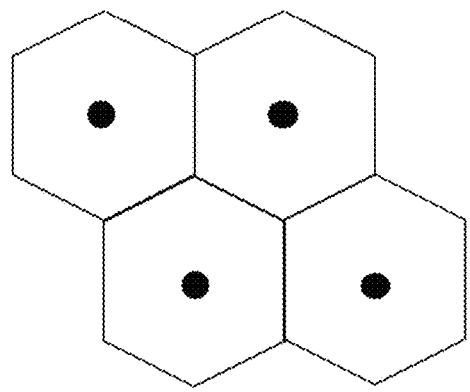
FIG. 12 is a schematic top view diagram of the principle of the optical element of FIG. 11 in the operating state B1.
Figure 13:
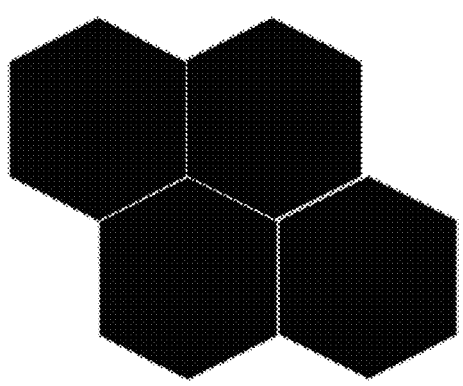
FIG. 13 is a schematic top view diagram of the principle of the optical element of FIG. 11 in the operating state B2.

FIG. 11 is a schematic top view diagram of the principle of an optical element in a second modification of the first alternative. This optical element comprises a planar substrate S with a first large surface adapted to function as a light entrance surface and a second large surface adapted to function as a light exit surface, plus a liquid or a skeleton matrix F arranged between the first and the second large surface and containing up to 60 volume percent of electrophoretically or magnetophoretically movable particles P, with a multiplicity of particles P being provided that absorb light of one or several wavelengths or wavelength ranges. On one or both of the two large surfaces and/or between the large surfaces in the substrate S, planar electromagnetic switching means E1, E2 are fashioned, which in a switched-on state generate an electromagnetic field effective between the large surfaces, whereby the particles P in the liquid or in the skeleton matrix F are moved. This causes a change of the transmission by the optical element of light of the wavelengths or wavelength ranges absorbed by the particles P, with the transmission is more than 50% in a first operating state B1 and less than 50% in a second operating state B2, referred to the direction normal to the second large surface of the substrate S. In that case, the electromagnetic switching means E1 or E2 may, for example, be of honeycomb, cylindrical or rectangular shape and fill all, or part of, the large surfaces of the substrate S, including the possibility that an entire large surface can be covered by a single electrode (e.g., E2) of appropriate dimensions. The principle of the optical element shown in FIG. 11 is illustrated in a top plan view of operating state B1 by FIG. 12, and of the corresponding operating state B2 by FIG. 13. In the operating state B1 shown in FIG. 12, the particles P are concentrated at electrodes E1 of the switching means because of a static electric field applied, so that the transmission of the optical element in a perpendicular direction reaches a maximum. By contrast, in the operating state B2 shown in FIG. 13, the particles $P_A$ are concentrated at electrodes E2 of the switching means because of a static electric field applied, so that the transmission of the optical element in a perpendicular direction reaches a minimum. Preferably, the said transmission changes from more than 80% in the operating state B1 to less than 10% in the operating state B2, which is possible without any problem by a suitable selection of the parameters. This embodiment of the optical element in a second modification of the first alternative is applicable especially for the purpose of controlling the perpendicular (but, in combination therewith, also the non-perpendicular) light passage with regard to transmission. One possible application would be, e.g., the complete or partial dimming of window panes in a car to avoid dazzling the driver in certain situations. Moreover, the optical element can be used to implement, e.g., switchable mirrors.

Figure 14:
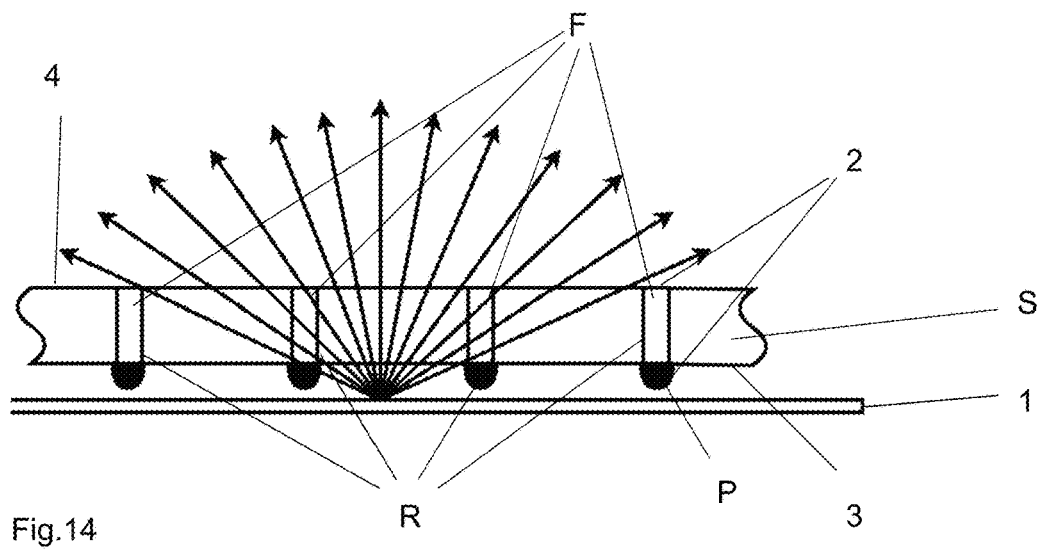
FIG. 14 is a schematic top view diagram of an optical element according to a second alternative in the operating state B1.
Figure 15:
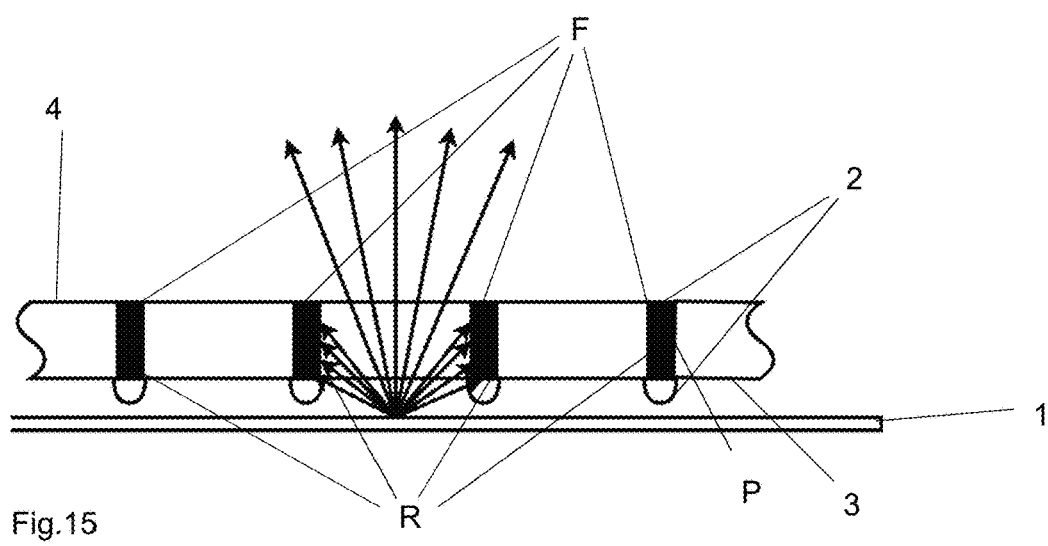
FIG. 15 is a schematic diagram of the principle of the optical element of FIG. 14 according to a second alternative in the operating state B2.

Whereas the optical element described above, at least in the fundamental embodiments, has no chambers—also called fluid chambers—, that form a louver either separately or in a group, such chambers are provided in all embodiments of the second to fourth alternatives described hereinafter. FIG. 14 is a schematic diagram of the principle of an optical element according to a second alternative in the operating state B1; FIG. 15 illustrates that optical element in the operating state B2.

The optical element shown in FIG. 14 and FIG. 15 comprises an essentially planar substrate S with a first large surface 3 adapted to function as a light entrance surface, and a second large surface 4 adapted to function as a light exit surface, plus a multiplicity of fluid chambers and embedded in the substrate S, fashioned louver-like with long sides and narrow sides extending between the first large surface 3 and the second large surface 4, with the narrow sides being arranged in the region of the large surfaces 3, 4, and with the long sides connecting them. The fluid chambers are filled with a liquid F, which contains up to 50 volume percent, preferably up to 20 volume percent electrophoretically or magnetophoretically movable particles P that absorb light of one or several wavelengths or wavelength ranges. The height of the louvers should be effectively limited to the quantity of the particles, i.e., to 50% or 20%, respectively, of the chamber height. Too high a concentration of particles, however, reduces switchability because of instability and shielding effects. On one or several sides of the fluid chambers R, electromagnetic switching means 2 are provided in planar form in the substrate S. In the switched-on state, the said switching means generate an electromagnetic field effective in the fluid chambers R, whereby the particles P are moved in the liquid F. This effects a change of an angle-dependent transmission, by the optical element, of light of the wavelengths or wavelength ranges that enters the substrate S through the light entrance surface 3 at angles that make the said light hit the fluid chambers R and is absorbed by the particles P.

The first and the second large surface 3, 4 of the planar substrate S are preferably arranged parallel to each other. In special configurations, however, e.g., if particular angle-dependent transmissions of the optical element are to be attained, the large surfaces 3, 4 may also be arranged in a non-parallel fashion, such as wedge-like with a defined angle of up to 20 degrees between them.

The first large surface 3 of the planar substrate S, adapted as a light entrance surface, is as a rule located on the rear side of the substrate S as seen by a viewer and, depending on the application of the optical element, borders, e.g., on an image display device 1, a light source or a volume of air. From the last-named objects, then, light enters the substrate through the said light entrance surface 3.

In this example, the fluid chambers R, fashioned louver-like with long sides and narrow sides extending between the first large surface 3 and the second large surface 4, have a cuboid form and are aligned parallel to the large surfaces 3, 4. By contrast, the remaining front faces are the two surfaces that do not embody any long or narrow sides. It is explicitly possible also that the fluid chambers R jut out at least partially from one or both large surfaces 3 and/or 4 of the substrate S, as shown in the drawings FIG. 14 and FIG. 15. Here, the one or several wavelengths or wavelength ranges in which the electrophoretically or magnetophoretically movable particles P absorb light are located in the visible spectrum and cover it substantially completely. The planar electromagnetic switching means 2 fashioned on one or several sides of the fluid chambers R in the substrate S are arranged, e.g., on the narrow sides of the respective fluid chambers R, as shown in FIG. 14 and FIG. 15. The particles P may be, e.g., nanoparticles, quantum dots and/or dyes, of the kind described repeatedly before. The liquid may be water, mixed with a 10 vol. -% ferrofluid and electrolytes.

Furthermore, the particles P are electrically charged, and the electromagnetic switching means 2 are adapted to function as electrodes for generating a static or dynamic electric field, so that the electromagnetic particles P move in the electric field in the liquid F. The corresponding electric field lines would then, in the middle of a fluid chamber R, be fashioned, e.g., in parallel, whereas on the margin they would rather show deviations from parallelism. By means of the electromagnetic switching means 2 fashioned, e.g., as transparent electrodes, and a trigger circuit, at least two operating states are defined, wherein, in a first operating state B1, the angle-dependent transmission amounts to more than 50% and, in a second operating state B2 to less than 50%. This applies to an angular range of more than 30° (an angle that can be varied to be, e.g., 10°, 20° or 25°), referring to a normal to the second large surface of the substrate and measured in a direction perpendicular to a length dimension of the louver-shaped fluid chambers R. Here, the length dimension is defined as the straight line connecting the centroids of the two front faces of each fluid chamber R. For the operating state B1, a static electric field is generated via the switching means 2 in order to move the particles P, whereas for the operating state B2 no electric field is applied in order to distribute the particles P by diffusion within the fluid chambers R.

To a preferred development of that embodiment, it applies that, in the first operating state B1, due to a static electric field, more than 70% of the particles P are located in regions on the sides of the fluid chambers R1, R2, . . . on which the electromagnetic switching means 2 are fashioned, and in the second operating state B2, in which the switching means 2 are configured in such a way that, rather than a static electromagnetic field, an electromagnetic field changing with time is provided, more than 50% of the particles P (primarily due to diffusion and/or the changing electromagnetic field) are predominantly evenly distributed in the fluid chambers R, so that the angle-dependent transmission is more than 60% in the first operating state B1 and less than 5% in the second operating state B2. This also applies to an angular range of more than 30° (this angle can be varied, too, e.g. to be 10°, 20° or 25°) referring to a normal to the second large surface of the substrate and measured in a direction perpendicular to a length dimension of the louver-shaped fluid chambers. Thus, the various operating states B1, B2, . . . differ especially by the fact that the local concentration and location of the particles P in den fluid chambers is changed in order to change the transmission properties due to absorption by the particles.

Favorably, the electromagnetic switching means 2 are transparent to at least 50%, preferably to more than 80%, of light in the visible wavelength range that enters the substrate S through the light entrance surface at a right angle. This also applies to all other embodiments.

The electromagnetic switching means (as also the fluid chambers R) may be subdivided into a number of separately switchable segments, thus enabling local switchability between the first operating state B1 and the second operating state B2. Here, local switchability means that a change of the operating state between B1 and B2 will not take place in all fluid chambers simultaneously, but rather the optical element will simultaneously have regions with each of the operating states B1 and B2. This is an advantage, e.g., if the optical element is used in front of a screen and, from a viewing angle greater than 30 degrees sideways, parts of the image contents displayed are to be visible, while other parts are not to be seen.

Figure 16:
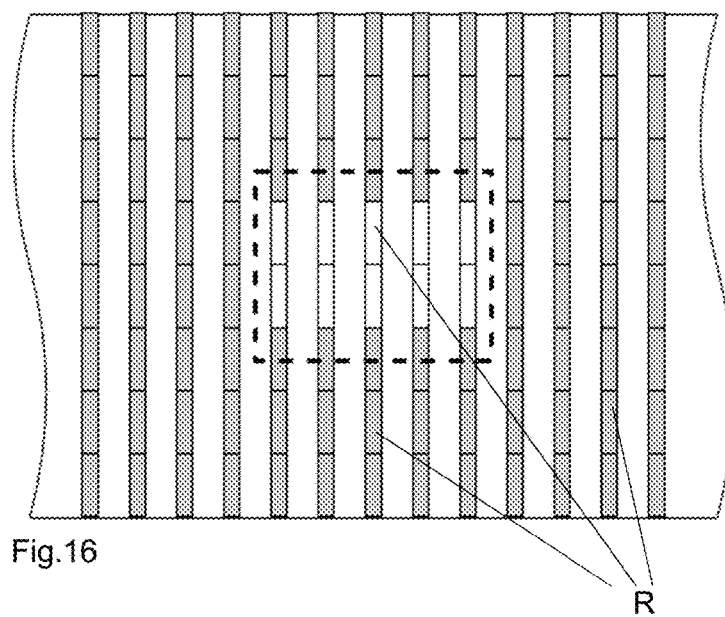
FIG. 16 is a schematic top view diagram of the principle of the optical element of FIG. 14, wherein, in varied t locations, both operating states B1 and B2 are switched on, and fluid chambers are arranged parallel to each other.

Such a configuration is shown in FIG. 16. This top view diagram illustrates the principle of an optical element according to the second alternative, wherein operating states B1 and B2 are switched on at varied locations, and wherein the fluid chambers are arranged parallel to each other. The bright fluid chambers R are in the operating state B1, whereas the dark ones are in the operating state B2.

Figure 17:
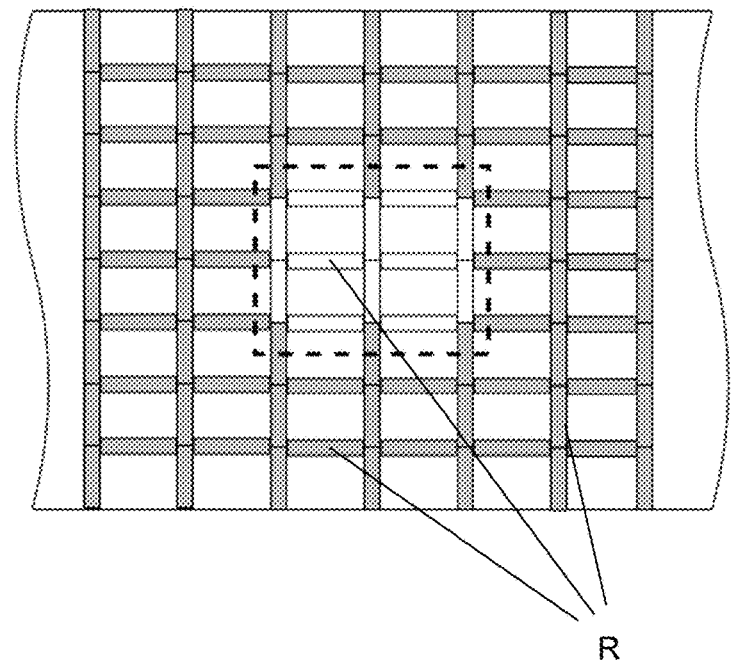
FIG. 17 is a schematic top view diagram of the principle of the optical element of FIG. 14, wherein, in varied t locations, both operating states B1 and B2 are switched on, and fluid chambers are arranged in a crosswise pattern.

The fluid chambers R can be aligned either in parallel, as shown in FIG. 16, of in a grid pattern of areas crossing each other as shown in FIG. 17. Accordingly, then, the angle-dependent transmission properties of the optical element will be established considering one plane, or two planes positioned at right angles to each other. The principle is illustrated in FIG. 17 by a top plan view of an optical element according to the second alternative of the invention, with locally varied operating states B1 and B2 switched on and with the fluid chambers arranged in a grid pattern. The bright fluid chambers R are in operating state B1 and the dark ones are in operating state B2.

To suppress Moiré effects, the fluid chambers (R), or the louvers in general, may also be arranged aperiodically, i.e. variably spaced from each other. Alternatively or as supplements, chambers of less regular shapes, such as bent chambers or curved louvers, are feasible as well.

One can also use several kinds of particles that differ in their absorption properties and/or their transport properties in the electromagnetic field. "Transport properties" refers especially to the behavior of the particles P in the respective phoresis (transport in the field). This version is brought to bear especially in case of nanoparticles: here, the difference between the particle kinds consists, e.g., in the particle size and/or the surface function, i.e., in the zeta potential. In case quantum dots or dyes are used as particles and if these are fluorescent, it is preferable to use, in addition, a so-called quencher material in order to avoid fluorescence.

As a rule, the fluid chambers (especially their long sides) will essentially be aligned parallel to the vertical bisector of the substrate S. On the other hand it is also possible for the fluid chambers R to be inclined relative to the vertical bisector of the substrate S by an angular range ("tilt angle") of −10° to +10°, or possibly even of −30° to +30°. This embodiment, too, has an influence on the angle dependence of the transmission of the optical element, especially, but not exclusively, in the operating state B2. Due to the said inclination or tilt angle, the angle-dependent absorption caused by the particle absorption and the particle positions within the fluid chambers is tilted by a fixed offset angle if, e.g., a low transmission at a particularly steep angle is desired.

For example, the fluid chambers R configured in louver fashion may, in a first plane parallel to the direction of the greatest dimension of the substrate S, have a width of about 10 µm (distance between the long sides of a fluid chamber R) and be spaced from each other by 50 µm (spacing between a long side of one fluid chamber R and the nearest long side of the nearest adjacent fluid chamber R. Finally, the fluid chambers R configured in louver fashion may have a height (distance between the two narrow sides) of about 40 µm, measured in a second plane perpendicular to the first plane.

All alternatives of an optical element—including those herein described previously as well as subsequently—can preferably be used together with a screen operable in a first operating state B1 for e free (public) viewing mode and a second operating state B2 for a restricted (private) viewing mode. Such a screen comprises, in addition to the optical element, an image display unit arranged, as seen from a viewer's end, behind or in front of the optical element. The image display unit 1 may be, e.g., an OLED display, an LCD display, an SED display, an FED display, a micro-LED display or a VFD display. As the optical element is operative irrespective of the type of the image display unit 1, any other display screens are eligible as well. Further, it is also possible to use an optical element as described herein previously or subsequently, in an image display unit provided with a backlight, e.g., in an LCD screen. Here, then, the optical element is favorably arranged between the image display panel (i.e., the LCD panel) and the backlight, to enable switching between a first operating state B1 for a free viewing mode and a second operating state B2 for a restricted viewing mode, because the light of the backlight, due to the optical element, is focused in one instance (in the operating state B2) and not focused in another instance (in the operating state B1).

The light emitted by the image display unit 1 enters the optical element through the light entrance surface, i.e., the large surface 3. Once inside the optical element, the said light is influenced in its propagation depending on the operating state, after which it is propagated further, leaving the optical element through the large surface 4 towards one or several viewers. The effect has already been described for the first alternative of an optical element in connection with FIG. 10. The explanations made there apply analogously here.

Besides, it should be remarked that, if electromagnetic switching means 2 are fashioned only on one surface of every fluid chamber R in the substrate S, the said switching means can, in a switched-on state in the fluid chambers R generate an electromagnetic field, which is effective within the fluid chambers and resembles an electromagnetic field of the type employed in what is known as IPS ("n-plane switching") LCD panels. This applies also to the alternatives described below.

Figure 18:
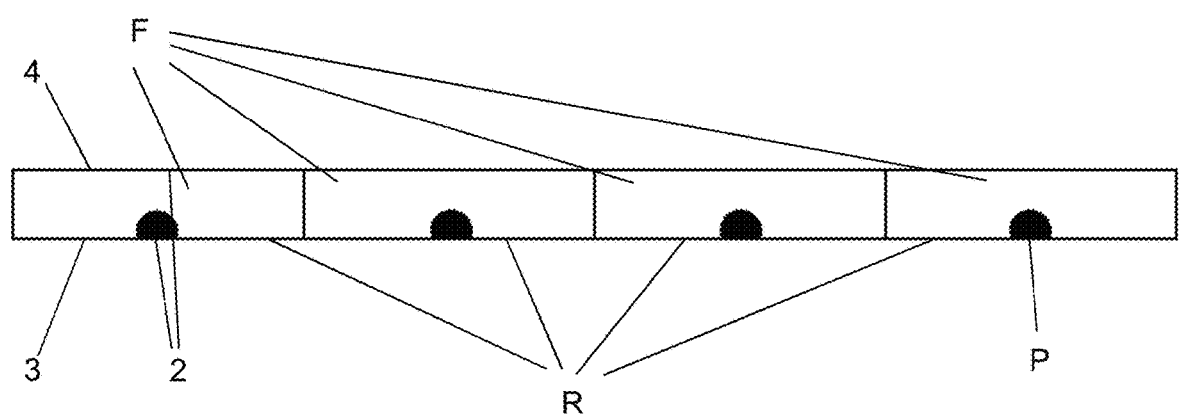
FIG. 18 is a schematic sectional diagram of the principle of an optical element according to a first modification of the second alternative.

FIG. 18 shows a first modification of the optical element according to the second alternative in an operating state B1. This modification comprises an essentially planar substrate S with a first large surface 2 adapted to function as a light exit surface, plus a multiplicity of fluid chambers R embedded in the substrate S, each with one or several surfaces. The fluid chambers R are filled with a liquid F, with the liquid containing up to 20 volume percent of electrophoretically or magnetophoretically movable particles P, which absorb light of one or several wavelengths or wavelength ranges. On one or several surfaces of the fluid chambers R in the substrate S, planar electromagnetic switching means are fashioned, which in the fluid chambers R, in a switched-on state, generate an electromagnetic field effective within the fluid chambers, by means of which the particles P are moved in the liquid, causing a change of the transmission by the optical element of light of the wavelengths or wavelength ranges that are absorbed by the particles P, wherein the transmission in a first operating state B1 is greater than 50% and in a second operating state B2 is less than 50%, referred to the direction of the normal to the second large surface of the substrate S. Preferably, the said transmission changes from more then 80% in the operating state B1 to less than 10% in the operating state B2, which, within the scope of the invention, is no problem to achieve by a suitable selection of the parameters.

In this case, the fluid chambers R are of honeycomb shape, e.g., and essentially fill the entire substrate S. In the operating state B1 shown in FIG. 18, the particles P, due to a static electric field applied, are concentrated at electrodes of the switching means 2, so that the transmission of the optical element reaches a maximum in the perpendicular direction. In the top plan view, this optical element is similar to that shown in FIGS. 12 and 13, with similar operating states, with the difference that here it is a case of fluid chambers.

This optical element, too, is especially applicable for controlling the perpendicular (but, in combination therewith, also the non-perpendicular) light passage with regard to transmission. One possible application would be, e.g., the complete or partial dimming of window panes in a car to avoid dazzling the driver in certain situations.

Described below are embodiments of an optical element according to a third and a fourth alternative. FIG. 19 is a schematic diagram of the principle of using two different kinds of particles in an optical element according to the third alternative. The particle kinds comprise first particles $P_A$ of a first kind of particles, which absorb light of one or several wavelengths or wavelength ranges in the region visible by a human eye. The particle kinds further comprise second particles $P_B$ of a second kind of particles, which reflect and/or scatter light of one or several wavelengths or wavelength ranges in the region visible by a human eye, where preferably several particles of both kinds are within a capsule indicated here by a circle.

In connection with the fourth alternative, FIG. 20 illustrates the principle of a first, preferred embodiment of so-called Janus particles. These have at least one first region with a first structure $P_1$ and, different therefrom, a second region with a second structure $P_2$, wherein the first structures $P_1$ absorb light of one or several wavelengths or wavelength ranges, whereas the second structures $P_2$ reflect and/or scatter light of one or several wavelengths or wavelength ranges.

In connection with the fourth alternative, FIG. 20 illustrates the principle of a second embodiment of Janus particles, in which the second region is markedly greater than the first region. Also in connection with the fourth alternative, FIG. 22 illustrates the principle of a third embodiment of Janus particles, in which there are, strictly speaking, three regions wherein two identical first regions with the first structure $P_1$ are separated by a second region with the second structure $P_a$. Further possible embodiments, e.g., having a third region with a third structure $P_3$, which has different fourth properties yet (e.g., reduced scattering or reflection compared to $P_a$), are feasible.

Figure 24:
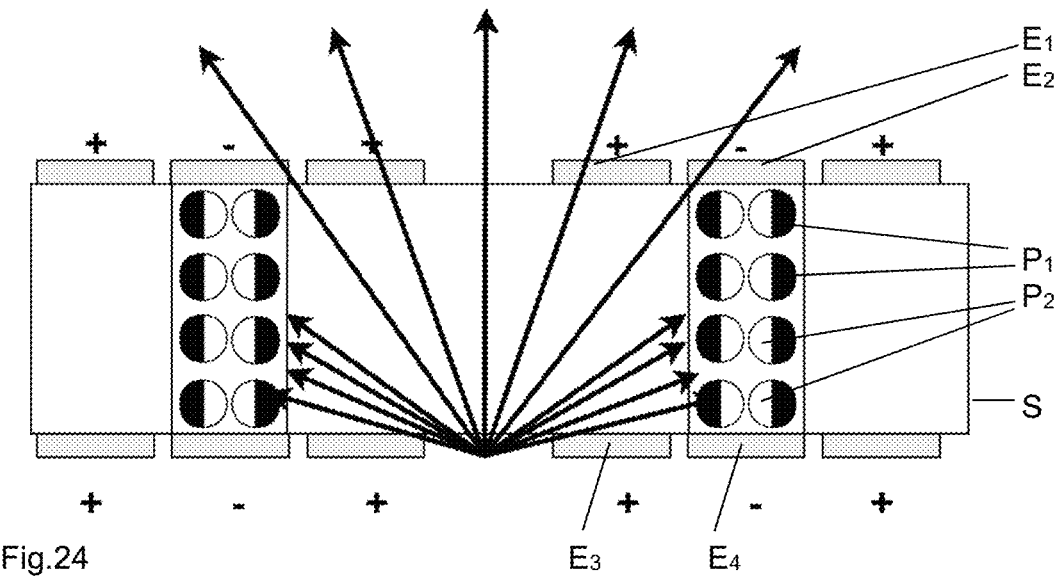
FIG. 24 is a schematic sectional diagram of the principle of a first embodiment of an optical element according to the third or fourth alternative in an operating state B2.

FIG. 23 is a schematic sectional diagram of the principle of a first embodiment of an optical element according to the third or fourth alternative in an operating state B1, and FIG. 24 illustrates the same optical element in the operating state B2. The circles represent either capsules filled with particles of the first and the second kind, or Janus particles. The optical element comprises an essentially planar substrate S with a first large surface adapted to function as a light entrance surface and a second large surface adapted to function as a light exit surface, plus a multiplicity of chambers R embedded in the substrate S, which, depending on their size, either form a separate louver each ore are grouped, with each group forming a louver. Each louver features long sides and narrow sides extending between the first and the second large surface, with the narrow sides of each louver arranged in the region of the large surfaces and the long sides connecting the large surfaces. The chambers R are filled with a liquid or a skeleton matrix F; the liquid or the skeleton matrix F contain up to 95 volume percent of electrophoretically or magnetophoretically movable particles P.

In a first embodiment of the third alternative, the particles comprise at least first particles $P_A$ of a first kind of particles, which absorb light of one or several wavelengths or wavelength ranges in the region visible by a human eye, and second particles $P_B$ of a second kind of particles, which reflect and/or scatter light of one or several wavelengths or wavelength ranges in the region visible by a human eye. If, in a second embodiment of the third alternative, only one of the two kinds of particles is provided, the liquid or the skeleton matrix F itself plays the part of either the first particles $P_A$ or the second particles $P_B$. The particles P, then, comprise the respective other particles $P_B$ or $P_A$ that are not implemented by the liquid or the skeleton matrix F, respectively.

In the fourth alternative, the particles P are configured as Janus particles and have at least a first region with a first structure $P_1$ and, differing therefrom, a second region with a second structure $P_2$, wherein the first structures $P_1$ absorb light of one or several wavelengths or wavelength ranges, and the second structures $P_2$ reflect and/or scatter light of one or several wavelengths or wavelength ranges.

The optical element according to the third or fourth alternative further comprises electromagnetic switching means, which are configured in planar fashion in the substrate S on one or several sides of the louvers and will, in a switched-on state, generate an electromagnetic field that is effective in the louvers, whereby the particles P in the liquid or in the skeleton matrix F will be moved, causing a change of the angle-dependent transmission, by the optical element, of light of the wavelengths or wavelength ranges that enters the substrate S through the light entrance surface at angles that make it light hit the louvers, and is absorbed by the particles P.

To simplify matters, all the following considerations regarding the drawings FIG. 23 through FIG. 26 are based on the version involving Janus particles according FIG. 20, even though the same connections between means and effects are also implementable for embodiments with particles $P_A$ and particles $P_B$.

In the second operating state B2 shown in FIG. 24, more than 70% of the first structures $P_1$ of the particles P are located on the long sides of the louvers and facing the long sides, whereas the second structures $P_2$ are facing away from the long sides. In the first operating state B1 shown in FIG. 23, by contrast, more than 70% of the second structures $P_2$ of the particles P are located on the long sides of the louvers and facing the long sides, whereas the first structures $P_1$ are facing away from the long sides. Due to the effect of the second structures $P_2$ in the first operating state B1, the angle-dependent transmission is more than 60%, and due to the effect of the first structures $P_1$ in the second operating state B2, it is the less than 5%, each in an angular range of more than 30° referred to a normal to the second large surface of the substrate S and measured in a direction normal to a length extension of the louvers.

On its top side and bottom sides—which correspond to the large surfaces—the optical element is provided with suitable electrodes E1, E2, E3, E4, . . . as electromagnetic switching means (of which only some are drawn and marked). The electromagnetic switching means configured in planar fashion in the substrate S on one or several sides of the chambers are arranged, e.g., on the narrow sides of the respective chambers. A comparison of FIG. 23 and FIG. 24 reveals that, in the different operating states, the above-mentioned electrodes are switched or polarized in correspondingly different ways to enable the Janus particles to move (rotate). Like the chambers, the electromagnetic switching means can be divided into several, separately switchable segments, so that it is possible to switch between the first operating state B1 and the second operating state B2 at selected locations. The expositions in connection with FIG. 16 and FIG. 17 apply here analogously, also with regard to the arrangement of the louvers and a tilting of the chambers. The said electrodes E, E1, E2, . . . may be arranged parallel or normal to, or at another defined angle relative to, the first large surface of the substrate S.

For the embodiments described above and hereinafter, it applies that either the particles P are electrically charged and the electromagnetic switching means are fashioned as electrodes for generating a static or dynamic electric field, or that the particles P are magnetic and the electromagnetic switching means are fashioned as electromagnetic layers for generating a static or dynamic magnetic field, so that the electromagnetic particles P in the electric or magnetic field in the liquid perform a motion. With a homogeneous electric field applied, e.g., the corresponding electric field lines, then, are established parallel in the middle of a fluid chamber, whereas on the margins they rather deviate from parallelism.

Figure 25:
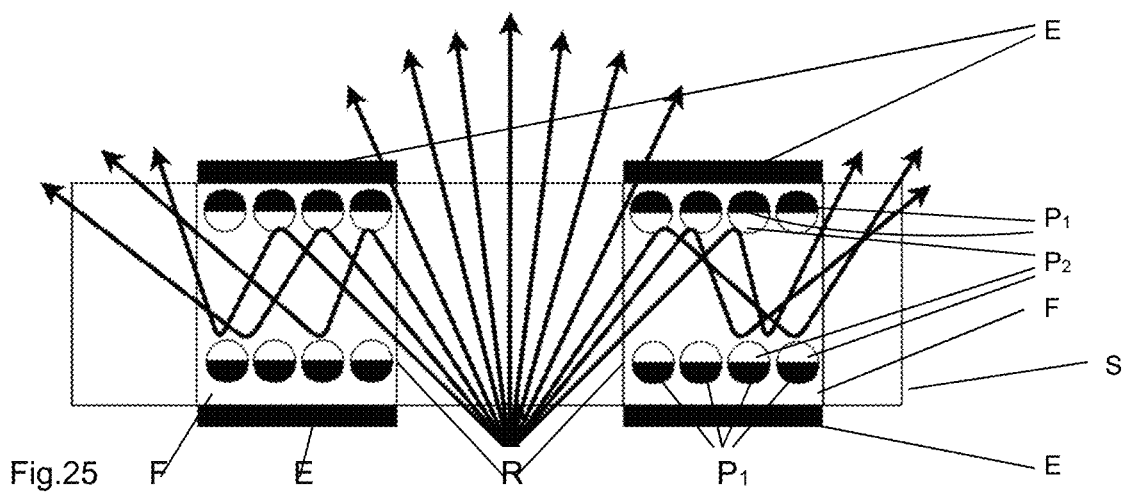
FIG. 25 is a schematic sectional diagram of the principle of a second embodiment of an optical element according to the third or fourth alternative in an operating state B1.
Figure 26:
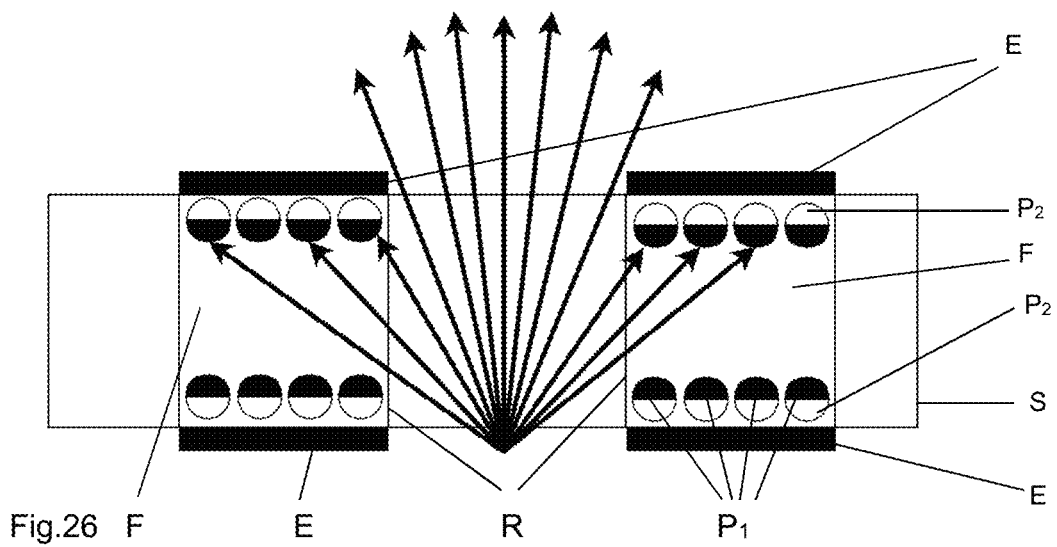
FIG. 26 is a schematic sectional diagram of the principle of a second embodiment of an optical element according to the third or fourth alternative in an operating state B2.

FIG. 25 and FIG. 26 are schematic sectional diagrams of the principle of a second embodiment of an optical element according to the third or fourth alternative, with FIG. 25 showing an operating state B1 and FIG. 26 an operating state B2. In the first operating state B1 according to FIG. 25, more than 70% of the first structures $P_1$ of the particles P are located on the narrow sides of the louvers and facing the narrow sides, whereas the second structures $P_2$ are facing away from the narrow sides. In the second operating state B2 according to FIG. 26, more than 70% of the second structures $P_2$ of the particles P are located on the narrow sides of the louvers and facing the narrow sides, whereas the first structures $P_1$ are facing away from den narrow sides. In an angular range of more than 30° relative to a normal to the second large surface of the substrate, and measured in a direction normal to a length extension of the louver, the angle-dependent transmission is more than 60% in the first operating state B1 and less than 5% in the second operating state B2. Here again, electrodes E are provided as electromagnetic switching means. The effect of the optical element has already been described in connection with FIG. 10.

By means of the electromagnetic switching means and a trigger circuit, at least two operating states are defined, wherein the angle-dependent transmission is more than 50% in a first operating state B1 and less than 50% in a second operating state B2. This applies in an angular range of preferably +/−30° to +/−90° (i.e., from −90° to −30° and, at the same time, from +30° to +90°, but not between −30° and +30°) referred to a normal to the second large surface of the substrate and measured in a direction normal to a length extension of the louver-shaped (fluid) chambers. The angular range may be varied, instead of +/−30° comprising the ranges of +/−10° to +/−90°, +/−20° to +/−90°, +/−45° to +/−90° or +/−25° to +/−90°. Here, the length extension is defined by the straight line connecting the centroids of the two front faces of each fluid chamber.

The one or several wavelengths or wavelength ranges in which the electrophoretically or magnetophoretically movable particles $P_A$ or the structures $P_1$ of the Janus particles, respectively, absorb light, preferably lie in the visible spectrum and preferably cover this completely. For special purposes, though, they may also lie outside the visible spectrum, for example, if it is intended to influence UV or IR light such as in measurement procedures. The general expositions made above, especially those regarding the condition and geometry of the substrate and the positions of the light entrance and exit surfaces, apply here, too. Preferably, the particles P comprise first particles $P_A$ and/or second particles $P_B$, which are embedded in stationary capsules located on marginal areas of the chambers R or constitute the chambers R, or the particles P are configured as Janus particles, which occupy stationary locations on marginal areas of the chambers R but can rotate freely. If the particles P comprise first particles $P_A$ and/or second particles $P_B$, the first particles $P_A$ and the second particles $P_B$ can execute a translational motion along the electric or magnetic field. Alternatively, if the particles (P) are configured as Janus particles, the motion is preferably a rotation about a specified axis located parallel to a long or a narrow side of the louver.

The chambers configured in louver shape with long and narrow sides extending between the first large surface and the second large surface can, e.g., be aligned parallel to the large surfaces and, in the simplest case, have a cuboid form. It is also possible, though, that the narrow sides are trapezoid-shaped or bent (e.g., arch-shaped). In case of the cuboid (not cubic) shape, the narrow sides are oblong sides, then, which have a smaller surface area than the long sides, which, as a rule have the largest area of all six surfaces of a fluid chamber. Typically, the narrow sides are arranged parallel to the large surfaces of the substrate, or parallel to them save for a tilt angle described below, whereas the long sides are arranged normal to the large surfaces of the substrate, normal to them save for the tilt angle. By contrast, the remaining front faces are the two surfaces that embody neither narrow sides nor long sides. It is explicitly possible also that the chambers, or at least part of them, jut out from one or both large surfaces of the substrate. For example, the fluid chambers configured in a louver shape can, in a first plane parallel to the direction of the major dimension of the substrate, have a width between 2 μm and 30 μm (distance from one long side to the other long side of a fluid chamber) and be spaced from each other by minimally 10 μm and maximally 150 μm distance from a long side to the nearest long side of the nearest adjacent fluid chamber).

Finally, the chambers R of louver-like can have a height (distance from one narrow side to the other) of minimally 10 μm and maximally 300 μm, measured in a plane normal to the first plane.

Advantageously, the chambers are filled with a skeleton matrix F that is fashioned as a polymer matrix, especially a gel matrix. Such a polymer matrix has a characteristic mesh size. Due to that mesh size, small particles P sense less "resistance" than big particles P; hence, small and big particles P move at differing speeds. One advantage thereof is that it enables the switching times to be controlled and the homogeneous distribution of the particles P to be accelerated if they are fashioned as first particles of the first kind $P_A$ and second particles of the second kind $P_B$; for capsules and Janus particles this is irrelevant, though. Another advantage of such a polymer matrix is that it greatly impedes the diffusion so that the particles P will not move of their own accord, which is advantageous for the capsules. If the chambers are filled with a liquid, it is necessary, in case of scattering particles P, to have a refractive index contrast relative to the liquid F. In case that the particles P comprise first particles $P_A$ and/or second particles $P_B$, the first particles $P_A$ are configured, e.g., as nanoparticles, quantum dots and/or dyes with a spatial extension of maximally 200 nm, preferably of maximally 50 nm or, with particular preference, of maximally 20 nm. The second particles $P_B$ are configured as transparent or reflecting spheres with diameters between 5 nm and 5000 nm. Here it is feasible, e.g., that the first particles $P_A$ are configured as BPQDs (black phosphorus quantum dots), lead sulfide (PbS), CdTeSeS-type-II quantum dots or azo dyes, and/or as metal oxide particles, preferably of CrO (especially chromium (IV) oxide) or $Fe_2O_3$, and have a size between 2 nm and 50 nm, including these limits.

In the other version, the particles P are configured as Janus particles with spherical surfaces, in which the first and the second regions are each constituted by hemispheres of the spherical surfaces. Here, the particles P are configured as microparticles and have a spatial extension of maximally 200 μm, preferably of maximally 50 μm or, with particular preference, of maximally 20 μm. In particular, it is feasible that the Janus particles made of a transparent material, preferably polystyrene, melamine resin or silica, and that one of the hemispheres is coated with a metal layer of a metallic nanoparticle layer for implementing electrophoretic properties. Furthermore it is possible that the Janus particles are made of a transparent material, preferably polystyrene, melamine resin or silica, and that, for the implementation of magnetophoretic properties, one of the hemispheres is coated with a ferromagnetic and absorptive layer of metal or metal oxide, or a ferromagnetic nanoparticle layer, preferably with $Fe_2O_3$ nanoparticles, whereas the other hemisphere is coated with a reflecting layer, preferably a layer of silver or aluminum, or a white layer.

As already explained above, the essential characteristic of a spherical Janus particle is that it has two hemispheres that differ in their physical properties. The first hemisphere is intended to scatter or reflect, and the other to absorb, light incident on it. Thus, the light-absorbing first hemisphere quasi substitutes the properties of the first particles $P_A$ of the first kind, whereas the light-scattering/reflecting hemisphere substitutes the properties of the second particles $P_B$ of the second kind.

Janus particles suited to being used in the optical element can be configured, e.g., as a) a transparent sphere (polystyrene, melamine resin or silica) or a scattering sphere with an absorbing hemisphere, b) a colored or black sphere with a reflecting hemisphere, and c) a sphere with one reflecting and one absorbing hemisphere. A scattering sphere can be implemented, e.g., by means of TiO nanoparticles in a polystyrene sphere, or silica nanoparticles in a polystyrene sphere. In general, all materials that scatter or reflect white light are feasibly suitable. A refractive index contrast between the nanoparticles employed and the sphere material of the particles increases the scattering output of the transparent sphere. Alternatively, it is possible also to use a colored or black sphere for the particles P, e.g., one made of polystyrene and filled with absorbing nanoparticles, quantum dots (QD), or dyes. The examples for this are the same as for the particles $P_a$. A chromium (IV) oxide sphere with ferromagnetic properties can also be used. The reflecting hemisphere can be implemented, e.g., by means of a film or nanoparticles of aluminum, chromium, silver or other metals, as described for the second particles of the second kind $P_B$. Eligible materials for the absorbing hemisphere are, for example, carbon, chromium (IV) oxide, $Fe_2O_3$ as a film, or nanoparticles as described for $P_B$.

The electrophoretic properties are determined by the properties of the surfaces. These can be improved or controlled by a surface functionalization—preferably with high zeta potential—as already explained above in connection with particle configuration. For the Janus particles to be magnetophoretic, either the sphere itself, i.e., the material of the sphere, or one of the hemispheres, strictly speaking, a surface coating of this hemisphere, must be magnetophoretic. Magnetic materials are, e.g., nickel, iron or chromium (IV) oxide. When selecting the material, one must make sure that the magnetic dipoles of the spheres are permanent, so that Janus particles can be rotated in a directed manner. This can be achieved, e.g., with ferromagnetic Janus particles. Normally, the diameter of the Janus particles is more than 200 nm, and the thickness of the coatings is more than 10 nm; these sizes can, however, be greater or smaller.

With the embodiments of an optical element as described before, the transmission can be influenced dependent on the angle (and perpendicularly as an option), with the optical element being capable of switching between at least two operating states. It can be implemented at reasonable cost and is universally applicable, especially with diverse screen types, to enable switching between a protected (privacy) and a free (public) viewing mode, without essentially reducing the resolution of such a screen.

The optical element described above can, interacting with an image display device, be applied to advantage wherever confidential data are displayed and/or entered, such a entering a PIN or a password, data display on a money access center or payment terminal, or reading e-mails on mobile devices. As described further above, the optical element can also be used in a car. It is furthermore possible to use the optical element in connection with an image display for advertising purposes, e.g., if certain ads are intended to be seen by persons of a particular height, whereas other ads are intended to be seen by everybody.

What is claimed is:

1. An optical element, comprising
    an essentially planar substrate having a first large surface adapted to function as a light entrance surface and a second large surface adapted to function as a light exit surface,
    a liquid or a skeleton matrix that is arranged between the first and the second large surface and contains electrophoretically or magnetophoretically movable particles interacting with light of one or several wavelengths or wavelength ranges,
    an electromagnetic switching structure configured in planar fashion on one or both large surfaces and/or in the substrate between the large surfaces, and which, in a switched-on state, generates an electromagnetic field, whereby the particles are moved in the liquid or in the skeleton matrix, so that an angle-dependent transmission, by the optical element, of light of the wavelengths or wavelength ranges entering the substrate via the light entrance surface will change due to the interaction with the particles,
    wherein, in a first alternative, the particles absorb or scatter light of the wavelengths or wavelength ranges, the liquid or the skeleton matrix contains up to 60 volume percent of the particles, and the electromagnetic field is effective between the large surfaces, or, in a second, third and fourth alternative, the optical element comprises a multiplicity of chambers embedded in the substrate, which, depending on their size, either form a louver each or are gathered in groups, with each group forming a louver, the louvers extending between the first large surface and the second large surface, with each louver having long sides and narrow sides, and with the narrow sides of each louver being arranged within an area of the large surfaces and with the long sides connecting the large surfaces, wherein in the second alternative, the particles absorb or scatter light of the wavelengths or wavelength ranges entering the substrate via the light entrance surface at such angles as to hit the chambers adapted as fluid chambers, with each single chamber forming a louver and being filled with the liquid, wherein the liquid contains up to 50 volume percent of the particles, and with the electromagnetic switching structure, in the switched-on state, generating an electromagnetic field effective in the chambers, or wherein, in the third alternative, the liquid or skeleton matrix in the chambers contains up to 95 volume percent of the particles, with the particles comprising at least first particles of a first kind that absorb light of the said wavelengths or wavelength ranges, and/or second particles of a second kind that reflect and/or scatter light of the said wavelengths or wavelength ranges, wherein, in case there is only one kind of particles, the liquid or the skeleton matrix fulfills the role of the other kind of particles, causing a change of the angle-dependent transmission, by the optical element, of light of the said wavelengths that enters the substrate via the light entrance surface at such angles that make it hit the louvers, or wherein, in the fourth alternative, the liquid or skeleton matrix in the chambers contains up to 95 volume percent of the particles, with the particles being configured as Janus particles, each of which having at least one region with a first structure and a second region, differing from the first region, with a second structure, wherein the first structures absorb light of the wavelengths or wavelength ranges, and the second structures reflect and/or scatter light of the said wavelengths or wavelength ranges, causing a change of the angle-dependent transmission, by the optical element, of light of the wavelengths that enters the substrate via the light entrance surface at such angles that make it hit the louvers.

2. The optical element as claimed in claim 1, with a skeleton matrix configured as a polymer matrix, preferably as a gel matrix.

3. The optical element as claimed in claim 1 and according to the first, second or third alternative, wherein the particles according to the first or second alternative and the first particles der first kind according to the third alternative are configured as nanoparticles, quantum dots and/or dyes and have a spatial extent of maximally 200 nm or maximally 100 nm or maximally 50 nm or maximally 20 nm.

4. The optical element as claimed in claim 3 and according to the third alternative, wherein the second particles of the second kind are configured as transparent or reflecting spheres with diameters between 5 nm and 5000 nm.

5. The optical element as claimed in claim 3, wherein the particles, or the first particles of the first kind are configured as BPQDs (Black Phosphorus Quantum Dots), lead sulfide, CdTeSeS quantum dots, azo dyes and/or as metal oxide particles, preferably consisting of chromium oxide or $Fe_2O_3$ and having a size between 2 nm and 50 nm including these limits.

6. The optical element as claimed in claim 3, wherein the particles are configured as paramagnetic bodies, preferably as spheres having a diameter of at least 100 nm, made of a paramagnetic or diamagnetic carrier material with a relative magnetic permeability between 0.5 and 2, preferably melamine resin or polystyrene, either with the bodies being coated with paramagnetic or superparamagnetic nanoparticles with a relative magnetic permeability higher than 10, preferably $Fe_2O_3$ nanoparticles, or with the carrier material being permeated by these nanoparticles.

7. The optical element as claimed in claim 1 and according to the third alternative, wherein the first particles of the first kind and the second particles of the second kind are embedded in stationary capsules that are located at marginal surfaces of the chambers or constitute the chambers.

8. The optical element as claimed in claim 1 and according to the fourth alternative, wherein the particles are provided at stationary locations on marginal surfaces of the chambers.

9. The optical element as claimed in claim 1 and according to the fourth alternative, wherein the particles have spherical surfaces, with the first and the second regions being constituted by hemispheres of the spherical surface.

10. The optical element as claimed in claim 9, wherein the particles are configured as microparticles and have a spatial extent of maximally 200 µm, preferably of maximally 50 µm, or, with particular preference, of maximally 20 µm.

11. The optical element as claimed in claim 9, wherein the particles consist of a transparent material, preferably latex, PMMA, polystyrene, melamine resin or silica, and that one of the hemispheres is coated with a metal layer or a metallic nanoparticle layer to realize electrophoretic properties.

12. The optical element as claimed in claim 9, wherein the particles consist of a transparent material, preferably polystyrene, melamine resin or silica, and that one of the hemispheres is coated with a ferromagnetic and absorptive metal or metal-oxide or ferromagnetic nanoparticle layer, preferably with $Fe_2O_3$ nanoparticles, to realize magnetophoretic properties, whereas the other hemisphere is coated with a reflective layer, preferably a layer of silver or aluminum, or a white layer.

13. The optical element as claimed in claim 11, wherein the diameter of the particles is greater than 200 nm and the thickness of the coating layers is greater than 10 nm.

14. The optical element as claimed in claim 1, wherein either the particles are electrically charged and the electromagnetic switching structure are configured as electrodes for generating a static or dynamic electric field, or the particles are magnetic and the electromagnetic switching structure is configured as electrically conducting layers for generating a static or dynamic magnetic field, so that the electro-or magnetophoretic particles perform a motion in the electric or magnetic field in the liquid or skeleton matrix.

15. The optical element as claimed in claim 14 and according to the third alternative, wherein the first particles and the second particles execute a translational motion along the electric or magnetic field.

16. The optical element as claimed in claim 14 and according to the fourth alternative, wherein the motion is a rotatory motion about a specified axis positioned parallel to a long side or a narrow side of the louver.

17. The optical element as claimed in claim 1, wherein, by way of the electromagnetic switching structure and a trigger circuit, at least two operating states are defined depending on a location of the particles, wherein the angle-dependent transmission in an angular range of more than 30° to 90° is above 50% in a first operating state B1, and less than 50% in a second operating state B2, the angular range being referenced to a normal to the second large surface of the substrate and, if louvers are provided, measured in a direction normal to a lengthwise extension of the louvers.

18. The optical element as claimed in claim 17 according to the first alternative, wherein a first part of the electromagnetic switching structure is configured as planar electrodes E1 on the first and/or second large surface, whereas a second part of the electromagnetic switching structure is configured as electrodes E2 in the form of louvers between the first and the second large surface, with the louvers and a normal to the first or second large surface including an angle between 0° and 30°, and wherein in the first operating state B1, more than 70% of the particles are located on the electrodes E1, whereas, in the second operating state B2, more than 70% of the particles are located on or close to the electrodes E2, so that, in an angular range of more than 30° about a normal to the second large surface of the substrate, the angle-dependent transmission is greater than 60% in the first operating state B1 and less than 10% in the second operating state B2.

19. The optical element as claimed in claim 17 and according to the first alternative, wherein the electromagnetic switching structure is configured on the first and the second large surface as planar electrodes EPN with their polarity being reversible between positive and negative, and in the first operating state B1, the electrodes EPN on the first large surface have a positive polarity, and the electrodes EPN on the second large surface have a negative polarity, or vice versa, so that more than 70% of the particles are located not farther away from the electrodes EPN than maximally a quarter of a thickness of the liquid or the skeleton matrix and/or diffusely distributed in the liquid or the matrix, and, in the second operating state B2, seen along a normal to the first or second large surface, electrodes EPN of negative polarity on the first large surface are facing electrodes EPN of negative polarity on the second large surface, whereas electrodes EPN of positive polarity on the first large surface are facing electrodes EPN of positive polarity on the second large surface, wherein, along a preferred direction, on each of the large surfaces, an electrode EPN of negative polarity is arranged between two electrodes EPN of positive polarity, and an electrode EPN of positive polarity is arranged between two electrodes EPN of negative polarity, so that more than 70% of the particles are located between electrodes EPN of the same polarity, whereby, in an angular range of more than 30° about a normal to the second large surface of the substrate, the angle-dependent transmission in the first operating state B1 is greater than 60% and in the second operating state B2 is less than 5%.

20. The optical element as claimed in claim 17 and according to the first alternative wherein:
in addition to the particles, the liquid or the skeleton matrix contains further particles, the said particles reflect and/or scatter and/or transmit light of one or several wavelengths or wavelength ranges, and
the electromagnetic switching structure is arranged on the first and the second large surface as planar electrodes EPN, the polarity of which is reversible between positive and negative, wherein, seen along a normal to the first or second large surface, electrodes EPN of negative polarity on the first large surface are facing electrodes EPN of negative polarity on the second large surface, and electrodes EPN of positive polarity on the first large surface are facing electrodes EPN of positive polarity on the second large surface, and wherein, in a preferred direction, on each of the large surfaces, one electrode EPN of negative polarity is arranged between two electrodes EPN of positive polarity and one electrode EPN of positive polarity is arranged between two electrodes EPN of negative polarity, unless a blank space without an electrode is arranged between two electrodes EPN of positive polarity or two electrodes EPN of negative polarity, with the blank spaces being arranged periodically, and
the particles have electric charges of the one, and the further particles of the other polarity, and
in both operating states B1 and B2, more than 70% of the particles are located between the electrodes EPN of positive polarity and, complementarily thereto, more than 70% of the further particles are located between den electrodes EPN of negative polarity, or vice versa, wherein, in the first operating state B1 the further particles are located between electrodes of the same polarity, each of which borders on a blank space, and, in the second operating state B2, the particles are located between electrodes of the same polarity, each of which borders on a blank space,
so that, in an angular range of more than 30° about a normal to the second large surface of the substrate, the angle-dependent transmission is greater than 60% in the first operating state B1 and less than 5% in the second operating state B2.

21. The optical element as claimed in claim 20, wherein the electrophoretically movable further particles that scatter the light, are made of polystyrene, melamine resin or silica with particle sizes between 20 nm and 10 μm, and/or in that the further particles that reflect the light, are configured as silver nanoparticles with particle sizes between 10 nm and 50 nm.

22. The optical element as claimed in claim 20, wherein the magnetophoretically movable further particles that scatter the light are configured in paramagnetic fashion, permeated and/or coated preferably with nanoparticles of a magnetizable material, preferably nickel.

23. The optical element as claimed in claim 20, wherein, instead of the presence of further particles, the light guide features louver-like chambers in a louver-like arrangement, which contain a light-scattering gel matrix, in which the particles move dependent on the operating state.

24. The optical element as claimed in claim 17 and according to the second alternative, wherein, in the first operating state B1, more than 70% of the particles are located in such areas on the sides of the fluid chambers on which the electromagnetic switching structure is configured, and, in the second operating state B2, in which the switching structure is configured in such a way that there is no static electromagnetic or alternating electromagnetic field, more than 50% of the particles are prevailingly evenly distributed in the fluid chambers, so that, in an angular range of more than 30° referred to a normal to the second large surface of the substrate and measured in a direction normal to a lengthwise extension of the louver-shaped fluid chambers, the angle-dependent transmission amounts to more than 60% in the first operating state B1 and to less than 5% in the second operating state B2.

25. The optical element as claimed in claim 17 and according to the third or fourth alternative, wherein in the second operating state B2 more than 70% of the first particles or of the first structures of the particles, respectively, are located on longitudinal sides of the louvers, wherein, in case of the first structures, these are facing the longitudinal sides and the second structures are facing away from the longitudinal sides and, in the first operating state B1, more than 70% of the second particles or of the second structures of the particles, respectively, are located on the longitudinal sides of the louvers, wherein, in case of the second structures, these are facing the longitudinal sides and the first structures are facing away from the longitudinal sides, so that, in an angular range of more than 30° referenced to a normal to the second large surface of the substrate and measured in a direction normal to a lengthwise extension of the louvers, the angle-dependent transmission amounts to more than 60% in the first operating state B1 and less than 5% in the second operating state B2.

26. The optical element as claimed in claim 17 and according to the third or fourth alternative, wherein the first operating state B1 more than 70% of the first particles or of the first structures of the particles are located on the narrow sides of the louvers, wherein, in case of the first structures, these are facing onto the narrow sides, whereas the second structures are facing away from the narrow sides, and, in the second operating state B2, more than 70% of the second particles or of the second structures of the particles are located on the narrow sides of the louvers, wherein, in case of the second structures, these are facing onto the narrow sides, whereas the first structures are facing away from the narrow sides, so that, in an angular range of more than 30° referenced to a normal to the second large surface of the substrate and measured in a direction normal to a lengthwise extension of the louvers, the angle-dependent transmission amounts to more than 60% in the first operating state B1 and less than 5% in the second operating state B2.

27. The optical element as claimed in claim 17, wherein the electromagnetic switching structure is divided into several separately switchable segments, so as to enable local switchability between the first operating state B1 and the second operating state B2.

28. The optical element as claimed in claim 1, wherein the electromagnetic switching structure for light incident perpendicularly to the substrate via the light entrance surface, is transparent to at least 50% of the wavelength range visible by a human eye.

29. The optical element as claimed in claim 1, wherein the liquid or the skeleton matrix contains several kinds of particles that differ by their absorption properties and/or transport properties in the electromagnetic field.

30. The optical element as claimed in claim 1 according to the second, third or fourth alternative, wherein the louvers are aligned to each other either in parallel or in a grid pattern of intersecting areas.

31. The optical element as claimed in claim 1 according to the second, third or fourth alternative, wherein the louvers are inclined relative to the vertical bisector of the substrate S in an angular range of −30° to +30° or of −10° to +10°.

32. An optical element, comprising:
an essentially planar substrate comprising a first large surface adapted to function as a light entrance surface, and a second large surface adapted to function as a light exit surface,
a multiplicity of chambers embedded in the substrate, which, depending on their sizes, either each forming a separate louver or gathered in groups with each group forming a louver, each louver having longitudinal sides and narrow sides that extend between the first large surface and the second large surface, wherein the narrow sides of each louver are arranged within the area of the large surfaces and the longitudinal sides connect these, and wherein spaces between the louvers contain at least one opaque material,
a liquid or a skeleton matrix with which the chambers, are filled, wherein the liquid or the skeleton matrix contains up to 50 volume percent of electrophoretically or magnetophoretically movable further particles which reflect and/or scatter light of one or several wavelengths or wavelength ranges in the region visible to a human eye,
and electromagnetic switching structure configured in planar fashion in the substrate on the narrow sides of the louvers, wherein the switching structure in a switched-on state generates an electromagnetic field effective in the louvers, whereby the further particles are moved in the liquid or in the skeleton matrix, thus causing a change of an angle-dependent transmission, by the optical element, of light of the wavelengths or wavelength ranges that enters the substrate through the light entrance surface at angles at which it hits the louvers, and is reflected and/or scattered by the further particles.

33. The optical element as claimed in claim 32, wherein, in a first state B1, at least 70% of the further particles are arranged near the upper narrow sides of the louvers, whereby the light whose propagation direction is restricted due to the opaque material between the louvers enters the substrate through the light entrance side and is propagated within the louvers, is scattered and/or reflected at their upper narrow sides in a multiplicity of directions by the further particles, and, in a second state B2, at least 70% of the further particles are arranged near the lower narrow sides of the louvers, whereby the light entering the substrate through the light entrance side, while being scattered and/or reflected due to the effect of the further particles, is restricted with regard of its propagation direction because of the opaque material between the louvers.

34. An optical element, comprising:
a planar substrate having a first large surface adapted to function as a light entrance surface and a second large surface adapted to function as a light exit surface,
a liquid or a skeleton matrix that is arranged between the first and the second large surface and contains up to 60 volume percent of electrophoretically or magnetophoretically movable particles, wherein there is a multiplicity of particles that absorb or scatter light of one or several wavelengths or wavelength ranges,
electromagnetic switching structure that is configured in planar fashion on one or both large surfaces and/or in the substrate between the large surfaces, and, in a switched-on state, generates an electromagnetic field effective between the large surfaces, whereby the particles are moved in the liquid or in the skeleton matrix,
so that the transmission by the optical element of light of the wavelengths or wavelength ranges absorbed by the particles changes, wherein, in a first operating state B1, the transmission amounts to more than 50%, and, in a second operating state B2, to less than 50%, referred to the direction of the normal to the second large surface of the substrate.

35. An optical element, comprising:
a planar substrate with a first large surface adapted to function as a light entrance surface and a second large surface adapted to function as a light exit surface,
a multiplicity of chambers embedded in the substrate, each with one or several surfaces,
a liquid with which the chambers are filled, wherein the liquid contains up to 20 volume percent of electrophoretically or magnetophoretically movable particles, which absorb or scatter light of one or several wavelengths or wavelength ranges, electromagnetic switching structure that is configured in planar fashion on one or both surfaces of the chambers, and, in a switched-on state, generate an electromagnetic field effective inside the chambers, whereby the particles are moved in the liquid, so that the transmission, by the optical element, of light of the wavelengths or wavelength ranges absorbed by the particles changes, wherein, in a first operating state B1, the transmission amounts to more than 50%, and, in a second operating state B2, to less than 50%, with respect to a direction of a normal to the second large surface of the substrate.

36. A screen that can be operated in a first operating state B1 for a free viewing mode, and in a second operating state B2 for a restricted viewing mode, comprising at least one optical element as claimed in claim 1 and an image display device arranged in front of or behind the at least one optical element as seen by a viewer.

* * * * *

UNITED STATES PATENT AND TRADEMARK OFFICE
CERTIFICATE OF CORRECTION

PATENT NO. : 12,158,683 B2
APPLICATION NO. : 17/442078
DATED : December 3, 2024
INVENTOR(S) : Andreas Bregulla et al.

It is certified that error appears in the above-identified patent and that said Letters Patent is hereby corrected as shown below:

In the Specification

In Column 2, Line 22, delete "that that" and insert -- that --, therefor.

In Column 8, Line 19, delete "her" and insert -- here --, therefor.

In Column 12, Line 11, delete "he" and insert -- the --, therefor.

In Column 13, Line 29, delete "$P_2$of" and insert -- $P_2$ of --, therefor.

In Column 13, Line 58, delete "B2," and insert -- B2. --, therefor.

In Column 15, Line 7, delete "a" and insert -- as --, therefor.

In Column 15, Line 23, delete "se" and insert -- see --, therefor.

In Column 15, Line 28, delete "witching" and insert -- switching --, therefor.

In Column 27, Line 7, delete "then" and insert -- than --, therefor.

In Column 27, Line 57, delete "$P_a$" and insert -- $P_2$ --, therefor.

In Column 27, Line 60, delete "$P_a)$" and insert -- $P_2)$ --, therefor.

In Column 32, Line 35, delete "a" and insert -- as --, therefor.

Signed and Sealed this
Twenty-fifth Day of February, 2025

Coke Morgan Stewart
*Acting Director of the United States Patent and Trademark Office*